United States Patent
Kakeda et al.

(10) Patent No.: US 8,396,917 B2
(45) Date of Patent: Mar. 12, 2013

(54) STORAGE MANAGEMENT SYSTEM, STORAGE HIERARCHY MANAGEMENT METHOD, AND MANAGEMENT SERVER CAPABLE OF REARRANGING STORAGE UNITS AT APPROPRIATE TIME

(75) Inventors: Tomoaki Kakeda, Yokohama (JP); Takato Kusama, Kawasaki (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 12/719,818

(22) Filed: Mar. 8, 2010

(65) Prior Publication Data

US 2011/0161406 A1   Jun. 30, 2011

(30) Foreign Application Priority Data

Dec. 28, 2009   (JP) .................................. 2009-298018

(51) Int. Cl.
G06F 15/173   (2006.01)
(52) U.S. Cl. ........ 709/201; 709/203; 709/223; 711/137; 711/170; 713/300; 713/502
(58) Field of Classification Search .................. 711/137, 711/147, 170; 713/300, 502; 709/201, 203
See application file for complete search history.

(56) References Cited

U.S. PATENT DOCUMENTS

| | | | |
|---|---|---|---|
| 5,412,786 A * | 5/1995 | Kusano | 712/207 |
| 5,828,568 A * | 10/1998 | Sunakawa et al. | 713/320 |
| 5,829,042 A * | 10/1998 | Leung | 711/137 |
| 6,542,940 B1 * | 4/2003 | Morrison et al. | 713/502 |
| 2004/0083339 A1 | 4/2004 | Yamamoto et al. | |

(Continued)

FOREIGN PATENT DOCUMENTS

| | | | |
|---|---|---|---|
| JP | 2000-293317 A | 10/2000 | |
| JP | 2003-216460 A | 7/2003 | |

(Continued)

OTHER PUBLICATIONS

Japanese Patent Office action on application No. 2009-298018 dated Oct. 25, 2012; pp. 1-7.

*Primary Examiner* — Ramy M Osman
(74) *Attorney, Agent, or Firm* — Foley & Lardner LLP

(57) ABSTRACT

According to the present invention, it is possible to rearrange an arrangement unit on an appropriate storage device at a more appropriate timing in a complex computer system. A computer system according to the present invention includes a plurality of storage devices of different performance, and provides a virtual volume, the storage devices allocating a segment of the plurality of storage areas to an arrangement unit, which constitutes the target of a virtual volume, in accordance with the arrival of a write request from the business server, and managing, on the business server, an execution time and a predicted execution time of a job to be executed, and a time at which the storage area segment was allocated to the arrangement unit, inferring the relationship of the arrangement unit and the job from the job execution time and the time at which the storage area segment was allocated, and changing the storage area segment allocated to this arrangement unit to another storage area segment at a time decided based on the specified relationship and the predicted execution time.

9 Claims, 28 Drawing Sheets

U.S. PATENT DOCUMENTS

| | | |
|---|---|---|
| 2005/0268062 A1 | 12/2005 | Nagase et al. |
| 2008/0022050 A1* | 1/2008 | Fung .............................. 711/137 |
| 2008/0104431 A1* | 5/2008 | Shimada ........................ 713/300 |
| 2009/0193287 A1* | 7/2009 | Jeong ............................. 711/170 |
| 2009/0235269 A1 | 9/2009 | Nakajima et al. |
| 2009/0248953 A1 | 10/2009 | Satoyama et al. |
| 2009/0300285 A1 | 12/2009 | Nagai et al. |

FOREIGN PATENT DOCUMENTS

| | | |
|---|---|---|
| JP | 2007-066259 A | 3/2007 |
| JP | 2008-293223 | 12/2008 |
| JP | 2009-223442 | 10/2009 |
| JP | 2009-245387 | 10/2009 |

* cited by examiner

FIG. 7

| STORAGE POOL ID 0711 | LOGICAL VOLUME ID 0712 | STORAGE HIERARCHY 0713 | CAPACITY 0714 |
|---|---|---|---|
| 1 | 1 | 1 | 200GB |
| 1 | 2 | 1 | 200GB |
| 1 | 3 | 2 | 500GB |
| 2 | 4 | 2 | 500GB |
| 2 | 5 | 2 | 500GB |
| 1 | 6 | 3 | 500GB |
| ⋮ | ⋮ | ⋮ | ⋮ |

0701 STORAGE POOL CONFIGURATION TABLE

FIG. 8

| VIRTUAL LOGICAL VOLUME ID 0811 | STORAGE POOL ID 0812 | PAGE ALLOCATION HIERARCHY 0813 | ACCESS INFORMATION ACQUISITION DATE/TIME 0814 | ACCESS INTERRUPTION ARRANGEMENT HIERARCHY 0815 | CAPACITY 0816 |
|---|---|---|---|---|---|
| 1 | 1 | 1 | 07/16/2009 00:00 | 3 | 200GB |
| 2 | 1 | 1 | 07/16/2009 00:00 | 3 | 200GB |
| ... | ... | ... | ... | | |

0801 VIRTUAL LOGICAL VOLUME MANAGEMENT TABLE

FIG. 9

| PAGE ID 0911 | VIRTUAL LOGICAL VOLUME ID 0912 | STORAGE HIERARCHY 0913 | PAGE ALLOCATION DATE/TIME 0914 | CAPACITY 0915 |
|---|---|---|---|---|
| 1 | 1 | 3 | 07/01/2009 10:00 | 10MB |
| 2 | 1 | 3 | 07/05/2009 01:00 | 10MB |
| 3 | 1 | 3 | 07/07/2009 11:00 | 10MB |
| 4 | 1 | 2 | 07/13/2009 12:30 | 10MB |
| ⋮ | ⋮ | ⋮ | ⋮ | ⋮ |

0901 PAGE MANAGEMENT TABLE

FIG. 10

| JOB ID | REQUESTED PERFORMANCE | EXECUTION DAY | EXECUTION TIME SLOT | PROCESSING TARGET BASE POINT | PROCESSING TARGET PERIOD | REARRANGEMENT BUFFER TIME |
|---|---|---|---|---|---|---|
| 1 | 1 | DAILY | 08:00–20:00 | NEW DATA STORAGE | FIVE DAYS | 3 DAYS |
| 2 | 2 | SUNDAY | 01:00–02:00 | NEW DATA STORAGE | ONE WEEK | 3 DAYS |
| 3 | 1 | FIRST SUNDAY OF MONTH | 01:00–02:00 | NEW DATA STORAGE | ONE MONTH | 3 DAYS |
| ... | ... | ... | ... | ... | ... | ... |

1001 JOB MANAGEMENT TABLE

FIG. 11

| JOB RELATION ID | RELATED VOLUME ID | BASE POINT JOB RELATION ID | JOB ID |
|---|---|---|---|
| 1 | 1 | - | 1 |
| 2 | 1 | 1 | 2 |
| 3 | 1 | 1 | 3 |
| 4 | 2 | - | 2 |
| 5 | 1 | 2 | 3 |
| 6 | 2 | - | 3 |
| ⋮ | ⋮ | ⋮ | ⋮ |

1101 JOB RELATION TABLE

FIG. 12

| ARRANGEMENT UNIT ID 1211 | JOB RELATION ID 1212 | STORAGE HIERARCHY 1213 | RELATED LOG GROUP ID 1214 | ACCESS DATE/TIME 1215 | NEW DATA STORAGE 1216 |
|---|---|---|---|---|---|
| 1 | 1 | 1 | - | 07/01/2009 10:00 | 1 |
| 2 | 2 | 1 | - | 07/05/2009 01:00 | 1 |
| 1 | 2 | 1 | 1 | 07/05/2009 01:20 | 0 |
| 1 | 3 | 1 | 1 | 07/07/2009 11:00 | 0 |
| 3 | 2 | 1 | - | 07/12/2009 01:00 | 1 |
| 3 | - | 3 | - | 07/13/2009 01:00 | 1 |
| 4 | 1 | 1 | - | 07/13/2009 12:30 | 1 |
| ... | ... | ... | ... | ... | ... |

1201 JOB ACCESS LOG TABLE

FIG. 13

| ARRANGEMENT UNIT ID (1311) | JOB RELATION ID (1312) | REQUESTED PERFORMANCE (1313) | ACCESS PREDICTION DATE/TIME (1314) |
|---|---|---|---|
| 1 | 3 | 1 | 08/01/2009 01:00 |
| 2 | 3 | 1 | 08/01/2009 01:00 |
| 3 | 3 | 1 | 08/01/2009 01:00 |
| 4 | 2 | 2 | 07/19/2009 01:00 |
| 5 | 3 | 1 | 08/02/2009 01:00 |
| ⋮ | ⋮ | ⋮ | ⋮ |

1301 JOB ACCESS PREDICTION TABLE

FIG. 14

| ALERT ID (1411) | ARRANGEMENT UNIT ID (1412) | JOB ID (1413) | JOB RELATION ID (1414) | JALERT DATE/TIME (1415) |
|---|---|---|---|---|
| 1 | 3 | - | - | 07/13/2009 01:00 |
| ⋮ | ⋮ | ⋮ | ⋮ | ⋮ |

1401 ALERT TABLE

FIG. 22

| LOGICAL VOLUME GROUP ID (2211) | ACCESS INTERRUPTION ARRANGEMENT HIERARCHY (2212) |
|---|---|
| 1 | 3 |
| 2 | 3 |
| ⋮ | ⋮ |

2201 LOGICAL VOLUME GROUP MANAGEMENT TABLE

FIG. 23

| LOGICAL VOLUME ID (2311) | STORAGE HIERARCHY (2312) | LOGICAL VOLUME GROUP ID (2313) | CAPACITY (2314) | ACCESS INFORMATION ACQUISITION DATE/TIME (2315) | ALLOCATION-DESTINATION HOST (2316) |
|---|---|---|---|---|---|
| 1 | 1 | 1 | 500GB | 07/16/2009 00:00 | 1 |
| 2 | 2 | 1 | 500GB | 07/16/2009 00:00 | 1 |
| ⋮ | ⋮ | ⋮ | ⋮ | ⋮ | ⋮ |

2301 LOGICAL VOLUME GROUP MANAGEMENT TABLE

FIG. 26

| VIRTUAL LOGICAL VOLUME ID (2611) | STORAGE HIERARCHY (2612) | CAPACITY (2613) | CONFIGURATION CONFIRMATION DATE/TIME (2614) |
|---|---|---|---|
| 1 | 1 | | 07/02/2009 00:00 |
| 1 | 2 | | 07/02/2009 00:00 |
| 1 | 3 | | 07/02/2009 00:00 |
| 2 | 2 | | 07/02/2009 00:00 |
| ⋮ | ⋮ | ⋮ | ⋮ |
| 1 | 1 | | 07/03/2009 00:00 |
| ⋮ | ⋮ | ⋮ | ⋮ |

2601 VIRTUAL LOGICAL VOLUME HIERARCHY LOG TABLE

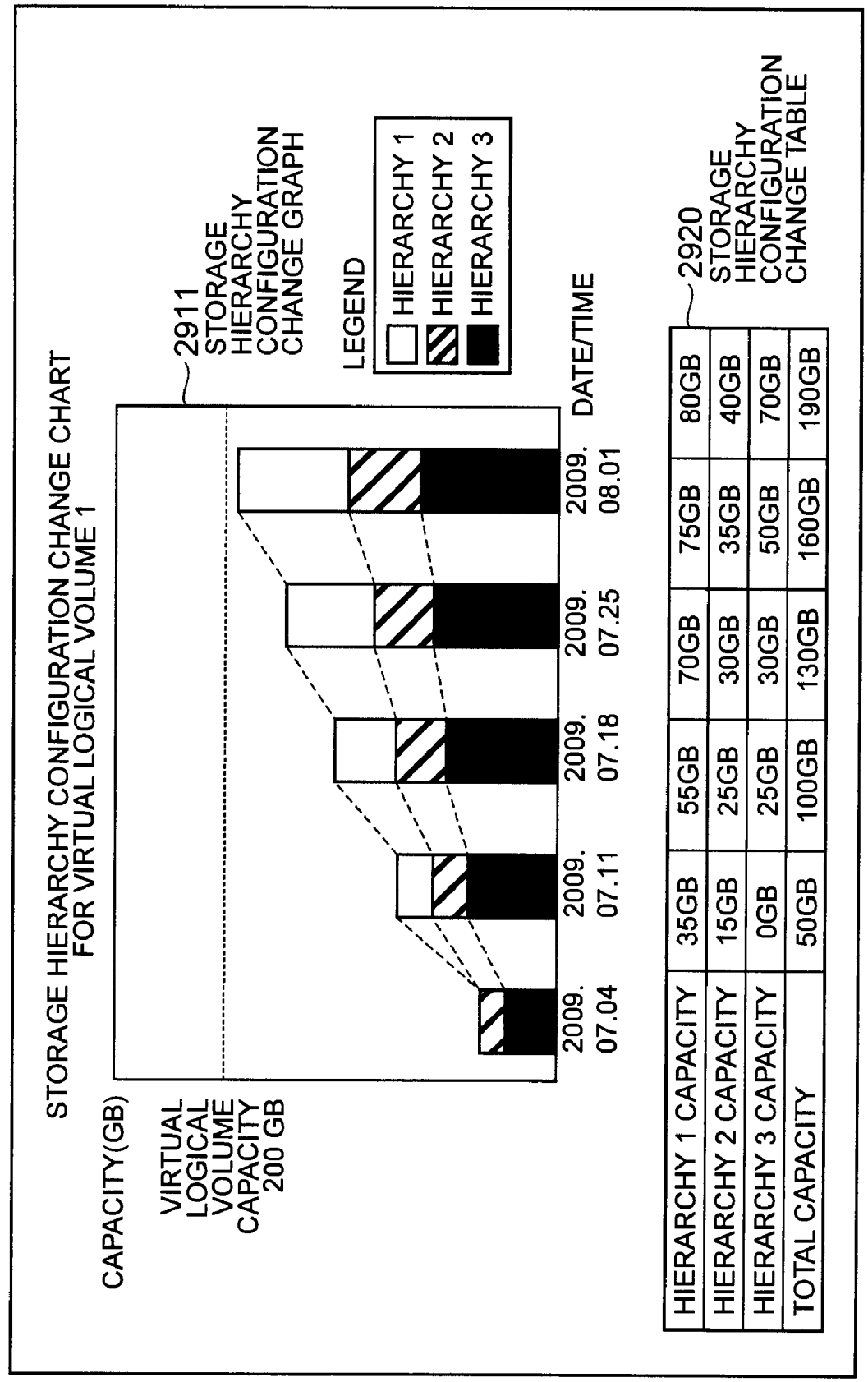

STORAGE MANAGEMENT SYSTEM, STORAGE HIERARCHY MANAGEMENT METHOD, AND MANAGEMENT SERVER CAPABLE OF REARRANGING STORAGE UNITS AT APPROPRIATE TIME

CROSS-REFERENCE TO PRIOR APPLICATION

This application relates to and claims priority from Japanese Patent Application No. 2009-298018, filed on Dec. 28, 2009, the entire disclosure of which is incorporated herein by reference.

BACKGROUND

The present invention generally relates to a storage management system and hierarchy management method for arranging, in the appropriate hierarchy at the appropriate timing, data in arrangement units represented by, for example, a volume or a volume segment based on the characteristic of a server job that makes use of storage in a hierarchical storage.

Lowering the cost of storage management has become a challenge in recent years in line with the growing quantities of data handled by companies. The implementation of hierarchy management is advancing as a procedure for reducing storage management costs. This hierarchy management is technology that combines expensive, high-speed disks with inexpensive, low-speed disks to configure a SAN (Storage Area Network), and rearranges data in accordance with the data access frequency.

In the technology disclosed in Japanese Patent Application Laid-open No. 2000-293317, a storage apparatus measures the access frequency for each volume accessed from a business server, and displays the measurement result to the storage administrator. Further, in the technology disclosed in Japanese Patent Application Laid-open No. 2000-293317, the storage apparatus migrates data stored in a volume from a first disk device to a second disk device based on an instruction from the storage administrator. Also, Japanese Patent Application Laid-open No. 2007-066259 discloses that access frequency measurements are performed for each segment of a volume.

In the hierarchy management represented in Japanese Patent Application Laid-open No. 2000-293317 and Japanese Patent Application Laid-open No. 2007-066259, it becomes possible for the storage apparatus administrator to effectively make proper use of high-speed disks and low-speed disks by rearranging a high-access-frequency volume in a high-speed disk and a low-access-frequency volume on a low-speed disk based on an access frequency measured in either the storage apparatus or in a server that issues an I/O request (for example, a read request or a write request).

Further, Japanese Patent Application Laid-open No. 2003-216460 discloses the realization of hierarchy management by carrying out rearrangement based not only on the access frequency of the past as disclosed in Japanese Patent Application Laid-open No. 2000-293317, but also on the result of a prediction that predicts the access frequency that will occur in the future based on an access cycle.

In this specification, a volume and a volume segment, which constitute the rearrangement target, are generically called the arrangement unit.

SUMMARY

In the prior art that utilizes Japanese Patent Application Laid-open No. 2003-216460, it is not possible to make an accurate access prediction in a complex computer system comprising a switch, a volume manager, a file system, and a plurality of application programs. Examples of the problems that occur are presented below.

1. In a conventional system that predicts an access cycle, an access log, which is needed for predicting the access cycle, must be stored beforehand. For this reason, is a case where it is not possible to store enough access logs, a situation arises in which either an arrangement unit that will not be accessed in the near future is arranged on a high-speed disk, or an arrangement unit that will be accessed in the near future is arranged on a low-speed disk.

2. Even in a case where sufficient access logs have been stored up, it is not possible to determine the job that accessed the arrangement unit in the storage apparatus when either a plurality of batch jobs or transaction jobs (hereinafter the two will generically be called jobs) access the arrangement unit. One example of the reason for this is that the business server does not attach information identifying a job to an I/O request, making it impossible to easily grasp the relationship between the job (or transaction) and the arrangement unit in the case of a complex computer system in which a storage apparatus-provided volume, such as file system, a volume manager, a virtualized switch, a database or the like, is provided to an application after a conversion process of some sort has been carried out. For this reason, in an environment in which a plurality of jobs having different access cycles coexist, it is extremely difficult to predict the access cycle for the arrangement unit. As a result of this, an inefficient disk arrangement, such as either arranging an arrangement unit that will not be accessed in the near future on a high-speed disk, or arranging an arrangement unit that will be accessed in the near future on a low-speed disk, occurs in an environment like this.

Accordingly, an object of the present invention is to provide a computer system that is able to rearrange an arrangement unit in a complex computer system in an appropriate storage apparatus at a more appropriate timing.

A computer system according to the present invention manages a storage apparatus, which comprises a plurality of storage devices of different performance, provides a virtual volume, and allocates a segment of the above-mentioned plurality of storage areas to an arrangement unit, which constitutes the target of a virtual volume, in accordance with the arrival of a write request from the business server, an execution time and a predicted execution time of a job to be executed on the business server, and a time at which the storage area segment was allocated to the arrangement unit, infers the relationship of the arrangement unit and the job from the job execution time and the time at which the storage area segment was allocated, and changes the storage area segment allocated to this arrangement unit to another storage area segment at a time decided based on the specified relationship and the predicted execution time.

According to the present invention, it is possible to rearrange an arrangement unit on an appropriate storage device at a more appropriate timing in a complex computer system.

BRIEF DESCRIPTION OF THE DRAWINGS

FIG. 7 is a diagram showing a storage pool management table;

FIG. 8 is a diagram showing a virtual logical volume management table;

FIG. 9 is a diagram showing a page management table;

FIG. 10 is a diagram showing a job management table;

FIG. 11 is a diagram showing a job relation table;

FIG. 12 is a diagram showing a job access log table;

FIG. 13 is a diagram showing a job access prediction table;

FIG. 14 is a diagram showing an alert table;

FIG. 22 is a diagram showing a logical volume group management table in a second embodiment;

FIG. 23 is a diagram showing a logical volume management table of the second embodiment;

FIG. 26 is a diagram showing a virtual logical volume hierarchy log table of the third embodiment;

FIG. 29 is a flowchart showing a configuration change in the storage hierarchies of a virtual logical volume displayed by the management client of the third embodiment.

DETAILED DESCRIPTION OF THE EMBODIMENTS

Figure 1:
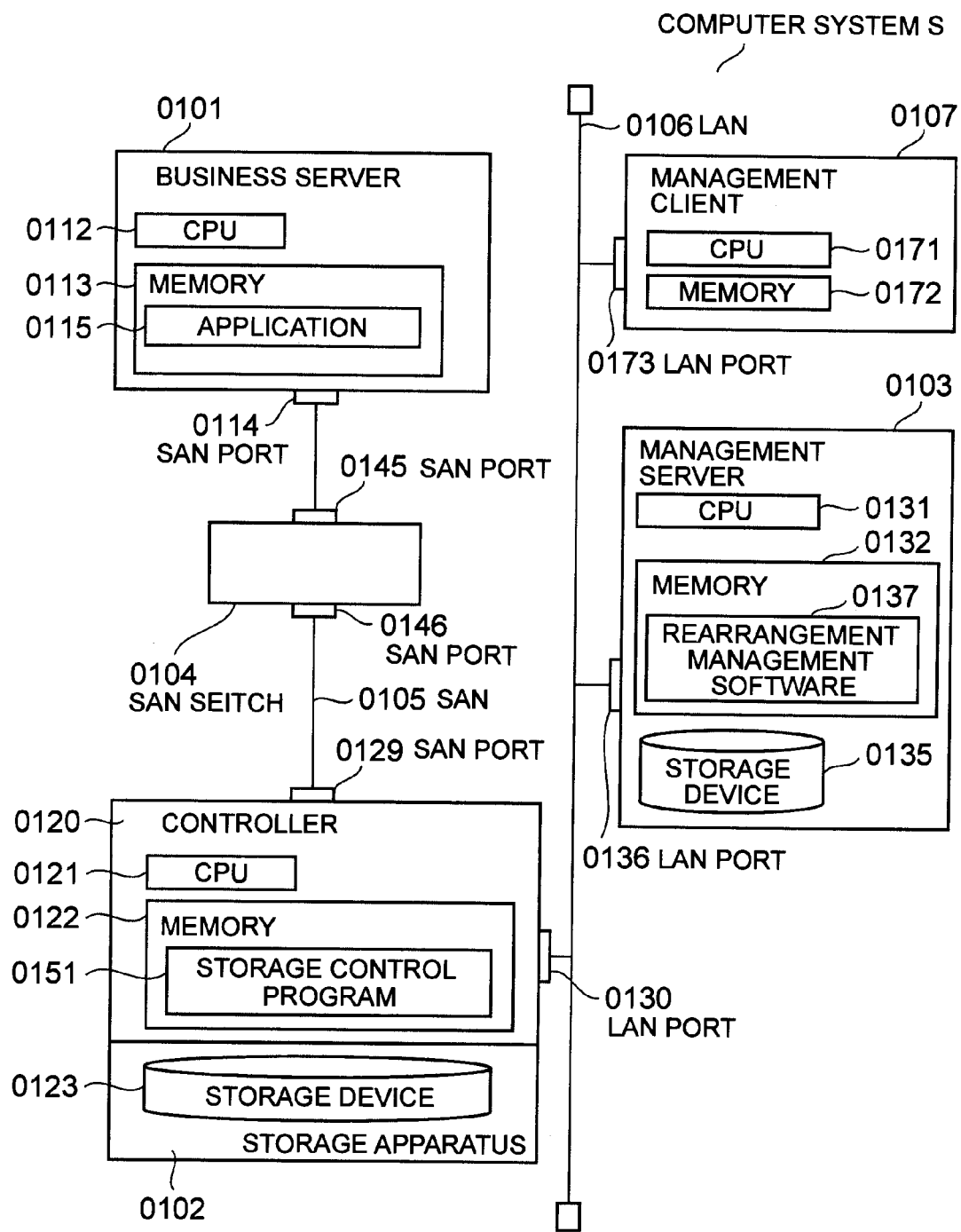
FIG. 1 is a diagram showing the overall configuration of a computer system.

The embodiments of the present invention will be explained below by referring to the drawings. Note that the present invention is not limited to these embodiments.

In the following explanation, the information of the present invention will be explained using expressions such as "aaa table", "aaa list", "aaa DB" and "aaa queue", but this information may be expressed using data structures other than the table, list, DB or queue. For this reason, in order to show that the information is not a function of the data structure, the information may be called "aaa information" with respect to the "aaa table", the "aaa list", the "aaa DB" and the "aaa queue".

Further, when explaining the contents of the respective information, expressions such as "identification information", "identifier", "name", and "ID" will be used, but these expressions are interchangeable.

In the following explanation, there may be instances when "program" is used as the subject of an explanation, but since a prescribed process is carried out by executing a program in accordance with the processor while using a memory and communication port (communication control device), the explanation may also use the processor as the subject. Also, a process that is disclosed having the program as the subject may be a process that a computer, such as a management server, and an information processing apparatus perform. Either all or a portion of the programs may be realized using dedicated hardware.

Further, various types of programs may be installed in the respective computers using a program delivery server or storage media.

First Embodiment

A first embodiment will be described by giving an example of an embodiment of the present invention in a case where the arrangement unit is a segment of a volume (hereinafter, a volume segment will be referred to as a page).

FIG. 1 is a diagram showing the overall configuration of a computer system of this embodiment. The computer system S is configured from a business server 0101, a storage apparatus 0102, a management server 0103, a SAN (Storage Area Network) switch 0104, and a management client 0107. The business server 0101 and the storage apparatus 0102 are coupled via a SAN 0105. The storage apparatus 0102, the management server 0103, and the management client 0107 are coupled via a LAN (Local Area Network) 0106. The business server 0101 is for running a job 0111, and comprises a CPU (Central Processing Unit) 0112 and a memory 0113. The business server 0101 comprises a SAN port 0114, and is coupled to the SAN 0105 via the SAN port 0114.

The CPU 0112 carries out various processing by reading and executing a program that is stored in the memory 0113.

The memory 0113 stores an application 0115, and information that the CPU 0112 needs when executing the application 0115. The application 0115 is a program for executing a business process, performs an operation or other such business process, and subsequently stores data in the storage apparatus 0102 and operates on the stored data for processing a data read or write.

The storage apparatus 0102 comprises a controller 0120 and a storage device 0123, the controller 0120 comprises a SAN port 0129, and is coupled to the SAN 0105 via the SAN port 0129. The controller 0120 comprises a LAN port 0130, and is coupled to the LAN 0106 via the LAN port 0130. The controller 0120 comprises a CPU 0121 and a memory 0122. The CPU 0121 carries out various processes by executing a program that is stored in the memory 0122.

The memory 0122 stores a storage control program 0151, and information needed when the CPU 0121 executes the storage control program 0151.

The storage control program 0151 is for managing a logical storage area of the storage apparatus 0102, and the storage control program 0151 composes the logical storage area of one or more storage device 0123. The storage control program 0151 and the logical storage area will both be explained in detail below using FIG. 3. Furthermore, the storage control program 0151 stores management information related to the above-mentioned process in the memory 0122. The storage control program 0151 also sends the above-mentioned management information to the management server 0103 in accordance with a request from the management server 0103. A request from the management server 0103, for example, may be send to the storage control program 0151 by way of the LAN 0106. The storage control program 0151 as necessary voluntary sends information to management server. The storage control program 0151 can send the management information via the SAN port 0129. The logical storage area managed by the storage control program 0151, the information stored in the memory 0122, and a function of the above-mentioned storage management functions will be explained in detail using FIG. 3.

The storage device 0123 that memorizes data is a storage device of the storage apparatus 0102. The storage device 0123, for example, is an FC (Fibre Channel) disk, an SSD (Solid State Drive), or the like. The storage device 0123 of FIG. 1 is configured from one device, but the present invention is not limited to one device, and may be configured from a plurality of storage devices. The management server 0103 comprises a CPU 0131, a memory 0132, an input unit 0133 that inputs data, a display unit 0134 that displays data, and a storage device 0135. The management server 0103 comprises a LAN port 0136, and is coupled to the LAN 0106 via the LAN port 0136.

The CPU 0131 included in the management server 0103 performs various processing by executing a program that is stored in the memory 0132.

The memory 0132 stores rearrangement management software 0137 and information needed when the CPU 0131 executes the rearrangement management software 0137.

The storage device 0135 stores information collected and managed by the rearrangement management software 0137.

The rearrangement management software 0137 comprises a function for rearranging an arrangement unit based on information collected by the storage apparatus 0102 and information acquired from the management client 0107, and a function for displaying a problem with respect to the rearrangement of the arrangement unit on the management client 0107. The rearrangement management software 0137 will be described in detail below using FIG. 4.

The SAN switch 0104 is a network device for relaying a data communication between the business server 0101 and the storage apparatus 0102, and comprises SAN ports 0145 and 0146.

The management client 0107 functions to provide the management server 0103 user interface, and comprises a CPU 0171 and a memory 0172. The management client 0107 comprises a LAN port 0173, and is coupled to the LAN 0106 via the LAN port 0173. In addition, the management client 0107 provides with input data unit and display unit. Input data unit is used to display information output from the management server. Display unit is used inputs data according to the demand by the management server, and is used so that the user may input information.

The CPU 0171 carries out a process for communication the information of the management client 0107 stored in the memory 0172 to the user. For example, the CPU 0171 provides the user interface by running a Web browser.

The memory 0172 stores the information of the management client 0107 and information related to the software that provides the user interface.

The computer system S of FIG. 1 is configured from one unit each of a business server 0101, a storage apparatus 0102, a management server 0103, and a SAN switch, but these components are not limited to one unit, and the present invention may be configured from pluralities of these devices. The business server 0101, the management server 0103, and the management client 0107 are computers. In addition, the management server 0103 may be realized by a plurality of computers, and the management server 0103 may also combine the role of the management client 0107.

Figure 2:
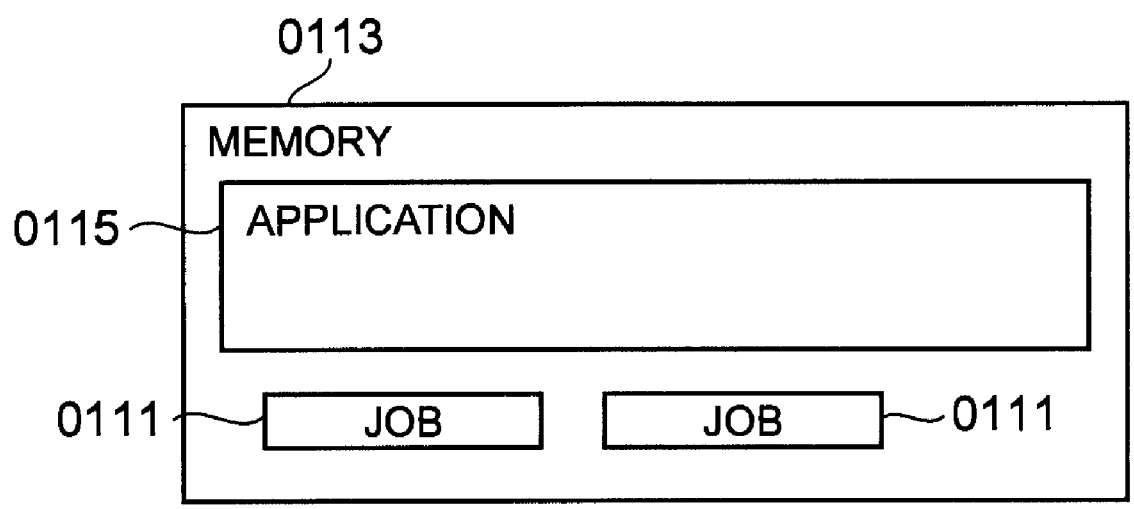
FIG. 2 is a diagram showing the logical configuration of a business server.

FIG. 2 is a diagram showing the logical configuration of the business server 0101. A job 0111 exists logically to control the execution of the application 0115 that executes the business process executed by the business server 0101, and the information (for example, an execution time, an execution condition, and so forth) needed to control the job 0111 is stored in the memory. The execution of the application 0115 of FIG. 2 is controlled by two jobs 0111, but the number of jobs is not limited to two, and control may be carried out by either one or a plurality of jobs 0111.

The jobs 0111 are each executed in accordance with either a date/time or a timing, and cause the application 0115 to either store data in the storage apparatus 0102 or operate on the stored data.

Figure 3:
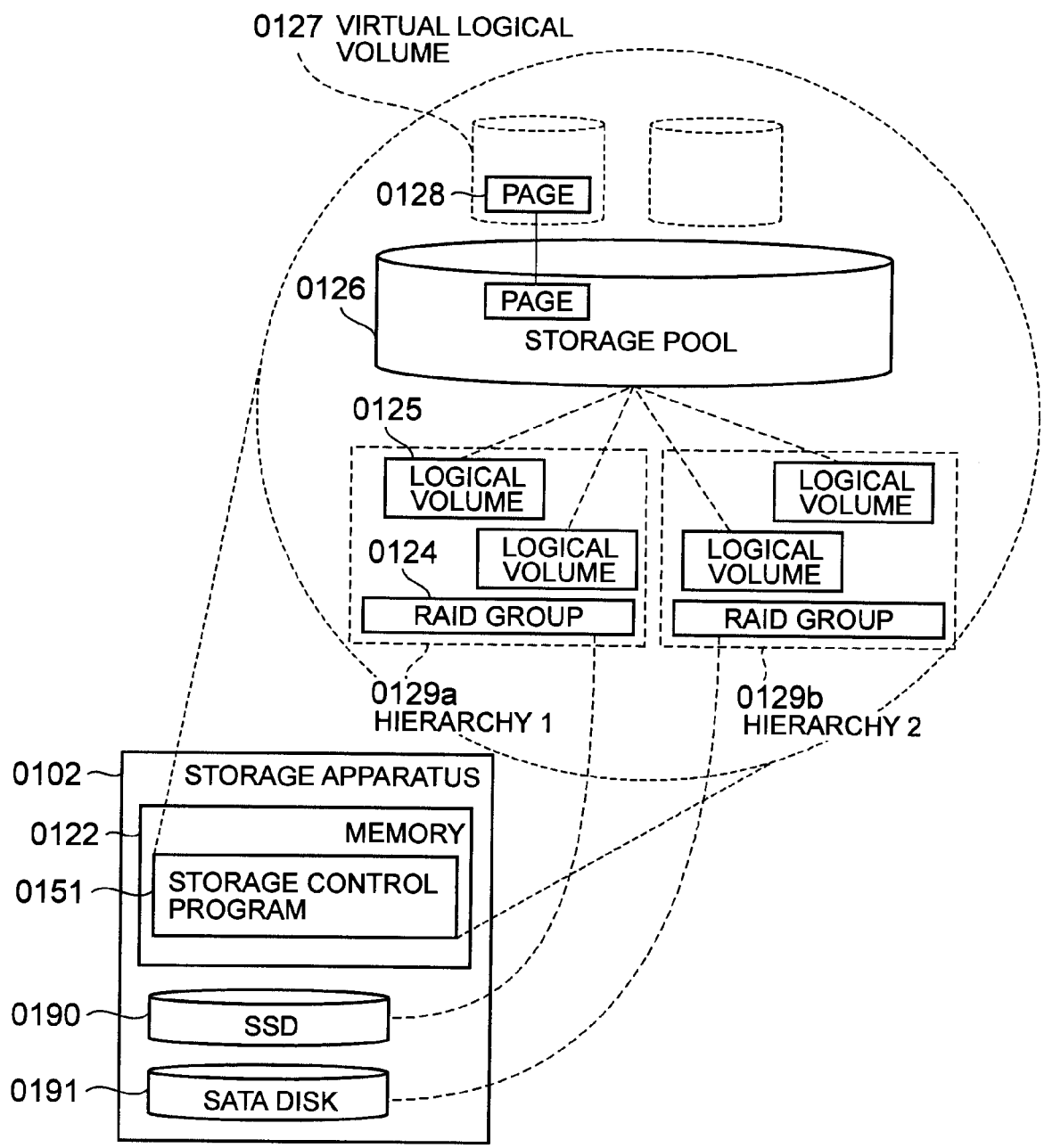
FIG. 3 is a diagram showing the logical configuration of a storage apparatus.

FIG. 3 is a diagram schematically showing a logical storage area in the storage apparatus 0102. Below, first the logical storage area and the storage control program 0151, and next the management information that is stored in the memory 0122 for managing this logical storage area will respectively be explained in detail. The storage control program 0151, as explained above, comprises a function for constructing a logical storage area from a plurality of storage devices 0123. In FIG. 3, it is supposed that SSD 0190 and SATA 0191 are being used as the storage devices 0123. For example, the storage control program 0151 is able to construct the logical storage areas described below.—a RAID group 0124
    a logical volume 0125
    a storage pool 0126
    a page 0128
    a virtual logical volume 0127

The respective logical storage areas will be explained in detail below.

The RAID group 0124 is a logical storage area, that is, a RAID (Redundant Arrays of Inexpensive (or Independent) Disks) configured from a plurality of storage devices 0123, and is constructed by the storage control program 0151. For example, the storage control program 0151, upon receiving a plurality of storage devices 0123 and a RAID level as input parameters, is able to construct a RAID group 0124 having the prescribed RAID level from the above-mentioned storage devices 0123.

The logical volume 0125 is a logical storage area inside the RAID group 0124, and is created by the storage control program 0151. For example, the storage control program 0151, upon receiving a creation-source RAID group 0124 and the size of the logical volume 0125 to be created as input values, is able to construct a logical volume 0125 of the specified size from the specified RAID group 0124.

The storage pool 0126 is a logical storage area configured from a plurality of logical volumes 0125, and is constructed by the storage control program 0151. For example, the storage control program 0151, upon receiving a plurality of logical volumes 0125 as input values, is able to construct a storage pool 0126 from the specified plurality of logical volumes 0125.

The page 0128 is either one or a plurality of logical storage areas constructed from the storage pool 0126, and is constructed by the storage control program 0151. For example, the storage control program 0151, upon receiving the size of the page 0128 to be created as an input value, is able to create the specified page 0128 from the storage pool 0126. The data to be stored on the page 0128 is stored in the logical volume 0125 that configures the relevant storage pool by way of the storage pool 0126 that configures this page. Hereinafter, the data of the page 0128 stored in the logical volume 0125 will be called the logical volume-stored page data.

The virtual logical volume 0127 (may also be simply called the virtual volume) is a volume that is exported to the business server, and is able to be exported to the business server as a virtual volume having a capacity that is equal to or larger than the capacity of the storage devices of the storage apparatus 0102. The virtual logical volume 0127 is constructed by the storage control program 0151. For example, the storage control program 0151, upon receiving the capacity of the virtual logical volume 0127 as an input value, is able to construct a virtual logical volume 0127 having the above-mentioned capacity from a plurality of pages 0128. When initially constructed, pages 0128 are not allocated to the respective address ranges of the virtual logical volume 0127 (at least not to a portion of the address ranges). Thereafter, in accordance with a write request from the business server, the storage control program 0151 will allocate either one or a plurality of pages 0128 to an address range of the virtual logical volume 0127 to which a page 0128 has not been allocated with respect to the target of the write request.

Since the storage devices 0123 in FIG. 3 comprise storage devices with different response performances, i.e., SSD 0190 and SATA 0191, the RAID group 0124 and the logical volume 0125 can be expressed as belonging to a hierarchy 1-0129a, the response speed of which is faster than a hierarchy 2, and a hierarchy 2-0129b, the response speed of which is slower than the hierarchy 1.

The storage control program 0151 provides the functions described below.

- A function for configuring the above-described logical storage area (a logical storage area configuration function)
- A function for allocating the logical volume 0125 and the virtual logical volume 0127 to the business server (a logical volume allocation function)
- A function for migrating data stored in the logical storage area to another logical storage area (a migration function)
- A function for allocating a page 0128 to the virtual logical volume 0127 in accordance with an I/O request from the business server (a virtual logical volume expansion function)
- A function for specifying beforehand a page candidate to be allocated at virtual logical volume expansion (a virtual logical volume expansion policy specification function)

The storage control program 0151 stores the management information related to the above-mentioned functions in the memory 0122. The storage control program 0151 sends the above-mentioned management information in accordance with a request from the management server 0103.

The management information stored in the memory 0122 will be explained in detail below.

The storage control program 0151 stores the following five data for managing the logical storage area in the memory 0122.

- The first data is a RAID group configuration table for storing the configuration information of the RAID group 0124. The RAID group configuration table comprises columns for a storage device ID, a RAID group ID, and a capacity. Information for uniquely identifying the storage devices 0123 that configure the RAID group 0124 and the RAID group 0124 are stored in the storage device ID column and the RAID group column. The capacity of the RAID group 0124 is stored in the capacity column.
- The second data is a logical volume configuration table for storing the configuration information of the logical volume 0125. The logical volume configuration table comprises columns for a logical volume ID, a RAID group ID, a capacity, a storage pool ID, and a business server ID. Information for uniquely identifying the logical volume 0125, the RAID group 0124 that constitutes the creation source of the logical volume 0125, the storage pool 0126, and the SAN port 0114 of the business server 0101 that constitutes the logical volume allocation destination are respectively stored in the logical volume ID column, the RAID group ID column, the storage pool ID column, and the business server ID column. The capacity of the relevant logical volume is stored in the capacity column. The WWN (World Wide Name) of the SAN port 0114 on the business server 0101 that exports this logical volume may also be stored in the business server ID column.
- The third data is a virtual logical volume configuration table for storing the configuration information of the virtual logical volume 0127. The virtual logical volume configuration table comprises a column for a virtual logical volume ID, a storage pool ID, a virtual logical volume expansion logical volume ID, and a business server ID. Information for uniquely identifying the virtual logical volume 0127, the storage pool 0126 to which the virtual logical volume 0127 belongs, and the SAN port of the business server 0101 that constitutes the allocation destination of the virtual logical volume 0127 are respectively stored in the virtual logical volume ID column, the storage pool ID column and the business server ID column. Information for uniquely identifying the logical volume 0125 that is used in a virtual logical volume expansion policy specification function is stored in the virtual logical volume expansion logical volume ID column. The virtual logical volume expansion policy specification function allocates to the relevant virtual logical volume a page 0128 for reading/writing data from/to the logical volume 0125 specified by the virtual logical volume expansion logical volume ID column when expanding the virtual logical volume 0127. The WWN of the SAN port 0114 on the business server 0101 that exports this logical volume may also be stored in the business server ID column.
- The fourth data is a page configuration table for storing the configuration of a page 0128 as well as an access log. The page configuration table comprises columns for a page ID, a virtual logical volume ID, a logical volume ID, and an allocation date/time. Information for uniquely identifying the page 0128, the virtual logical volume 0127 to which this page is allocated, and the logical volume 0125 that stores the date stored in this page are respectively stored in the page ID column, the virtual logical volume ID column and the logical volume ID column. The data and time at which the relevant page was allocated to the virtual logical volume 0127 are stored in the allocation date/time column.
- The fifth data is an access information table that records the date and time of an access with respect to a logical storage area. The access information table comprises columns for an access monitoring target type, an access monitoring target ID and a last access date/time. Information for uniquely identifying the type of the storage area for monitoring access is stored in the access monitoring target type column. For example, "RAID group", "logical volume", "page" and so forth are stored in this column. Information for uniquely identifying the monitoring target is stored in the access monitoring target ID column. The date and time at which the monitoring target was accesses are stored in the access date/time column. Note that information denoting the node that requested the access may be stored in an access-source column.

Figure 4:
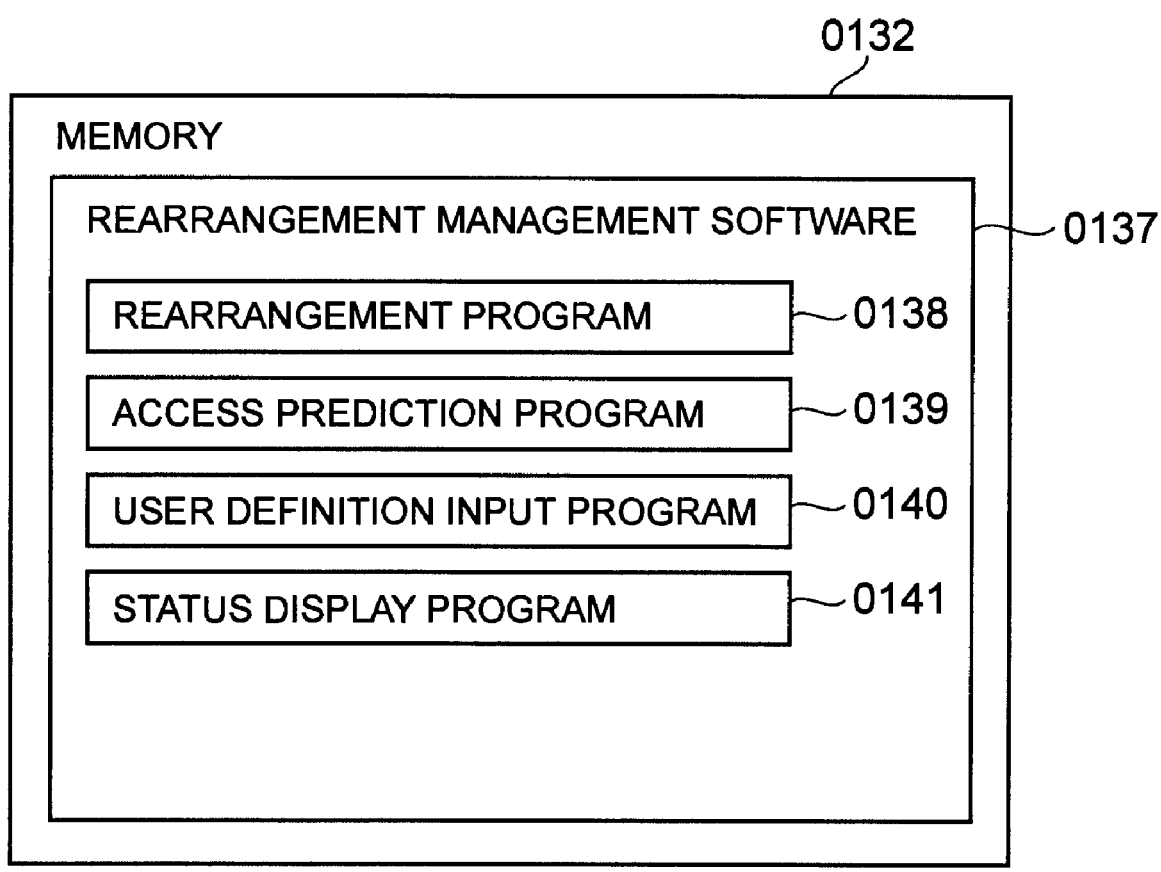
FIG. 4 is a diagram showing the logical configuration of a management server.

FIG. 4 is a diagram showing the logical configuration of the management server. The rearrangement management software 0137 stored in the memory 0132 is configured from a rearrangement program 0138, an access prediction program 0139, a user definition input program 0140, and a status display program 0141.

The rearrangement program 0138 comprises a function for directing the migration function of the storage apparatus 0102 and rearranging the arrangement unit based on the management information stored in the storage device 0135, and a function for updating the management information of the management server 0103. The migration function of the storage apparatus 0102 is a function that operates as written in another storage hierarchy 2 that reads the data at each arrangement allocated on the RAID group that arrangement hierarchy is included in storage hierarchy 1, memorizes in the memory among controllers once, and is different from storage hierarchy 1.

The access prediction program 0139 comprises a function for collecting management information from the storage apparatus 0102, a function for storing the management information in the storage device 0135, a function for determining a job that accessed the arrangement unit, and a function for predicting a job that will access the arrangement unit and the date and time of this access.

The user definition input program 0140 comprises a function for displaying information required to interact with the user, and a function for storing the user-inputted definition information in the storage device 0135.

The status display program 0141 comprises a function for displaying the status of the storage apparatus 0102 to the user.

Figure 5:
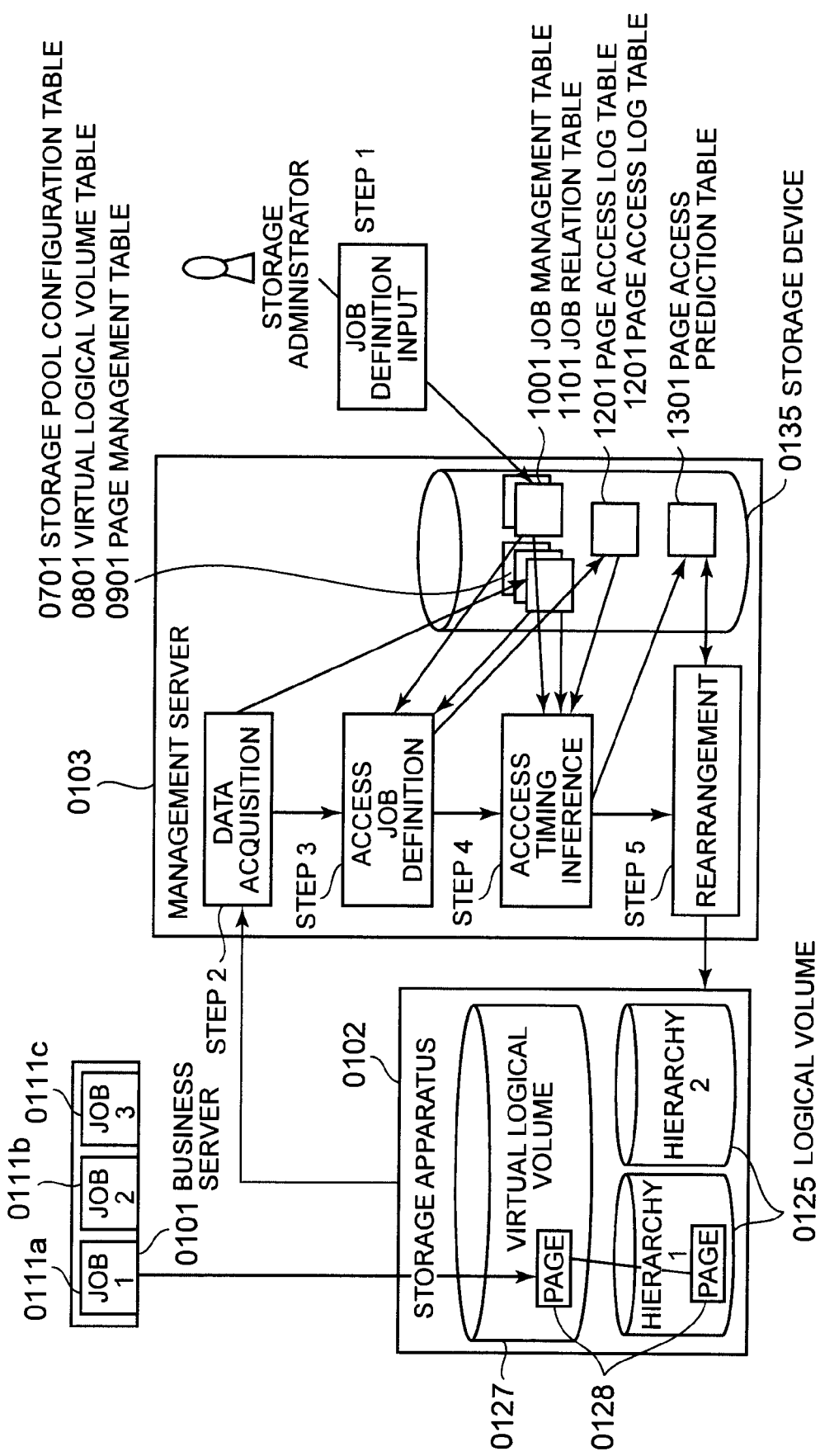
FIG. 5 is a diagram showing an overview of the present invention.

Next, an example of how the present invention operates in a situation in which a job 0111 of the business server 0101 accesses a page 0128 of the storage apparatus 0102 will be described using FIG. 5. In FIG. 5, the business server executes job 1-0111a, job 2-0111b, and job 3-0111c that are two or more jobs that control the execution of the application that executes the disposal of business affairs.

As step 1, the storage manager stores job definition (execution timing, dependence/order relations between jobs, and so forth) that the user defined beforehand in the storage device 0135 as a job management table 1001 (the job execution timing) and a job relation table 1101 (the dependence/order relations between jobs).

As step 2, the management server 0103 acquires page 0121 configuration information and a page 0121 access log from the storage apparatus 0102 and stores same in the storage device 0135 as a storage configuration table 0701, a virtual logical volume table 0801, and a page management table 0901.

As step 3, the management server 0103 infers the job relation, which is the job 1-0111a that accessed the page and the order relation thereof, from the page management table 0901, the job management table 1001 and the job relation table 1101, and stores this job relation together with the access time in a page access log table 1201.

As step 4, the management server 0103 uses the job relation table 1101 to infer the job that will access this page next for the information stored in step 3, infers the timing of the access to the page 0121 by associating the job management table 1001 with the inferred job and previous access time stored in the job access log table 1201, and stores the result in a page access prediction table 1301.

As step 5, the management server 0103, based on the page access prediction table 1301, instructs the storage apparatus to carry out a rearrangement to the higher-level hierarchy page, which is accessed as the result of a batch process that is performed in a short period of time. The management server 0103 also instructs the storage apparatus to carry out a rearrangement to the lower-level hierarchy page, which has not been accessed as the result of a batch process performed in a short period of time, from among the pages not currently being accessed. The storage apparatus 0102, which received the rearrangement instructions, carries out rearrangements of the above-mentioned page allocation destinations between the hierarchy 1-0129a and the hierarchy 2-0129b.

In this way, the present invention infers the job 0111 that accessed the arrangement unit of the page 0128, infers the job that will access the arrangement unit in the future based on information about the above-mentioned job that accessed the arrangement unit, regards the execution date/time of this job as the access prediction date/time, and rearranges the arrangement unit in line with the access prediction date/time. A rearrangement is also possible in the same way for an arrangement unit that is accessed from a plurality of jobs 0111. The storage configuration table 0701, the virtual logical volume table 0801, the page management table 0901, the job management table 1001, the job relation table 1101, the page access log table 1201, and the page access prediction table 1301 and the association method therefore will be explained in detail below.

Figure 6:
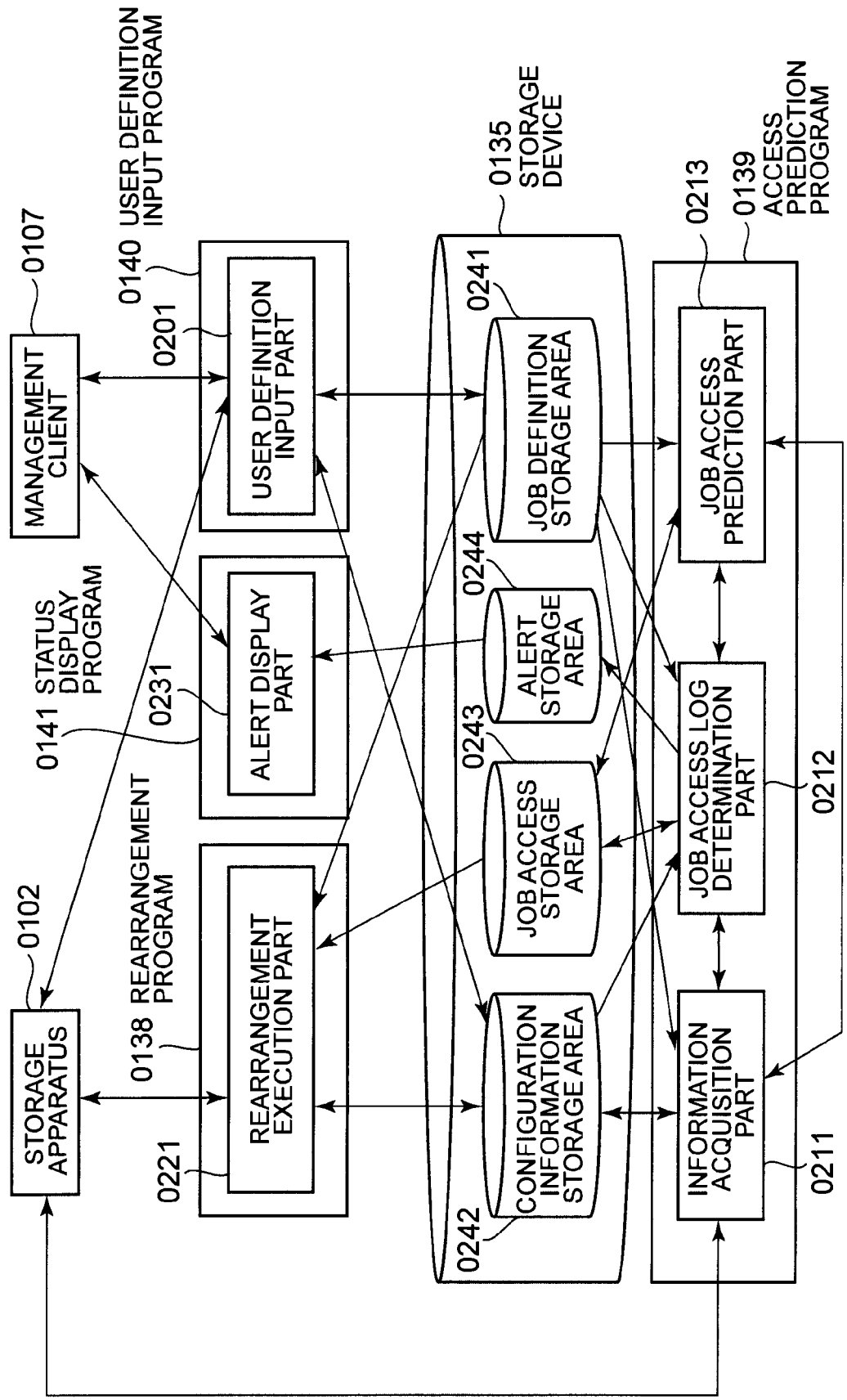
FIG. 6 is a diagram showing rearrangement management software modules.

FIG. 6 is a diagram showing the configuration of the rearrangement management software 0137 modules of this embodiment. And FIG. 6 relates to the information to be stored the storage device 0135 to rearrangement management software 0137 modules of this embodiment. The arrows in FIG. 6 represent the flow of data.

The storage device 0135 included in the management server 0103 maintains a job definition storage area 0241, a configuration information storage area 0242, a job access storage area 0243, and an alert storage area 0244. In addition, the storage device 0135 included in the management server 0103 stores information described as follows.

The job definition storage area 0241 stores a job definition inputted by the user. The information (table 1101 related to content of job management table 1001 and job) stored in the job definition storage area 0241 will be described in detail below using FIGS. 10 and 11.

The configuration information storage area 0242 stores configuration information acquired from the storage apparatus 0102 and storage hierarchy information inputted by the user from the management client 0107. As used here, a storage hierarchy denotes a group comprising either one or a plurality of logical volumes 0125. Typically, a storage hierarchy is constructed from a plurality of logical volumes having the same characteristics (for example, disk revolutions per minute, RAID level, type of storage device, model number, and so forth). In accordance with the user defining a storage hierarchy like this, for example, it is possible to select the migration-destination logical volume by simply selecting the storage hierarchy without manually selecting a migration-destination logical volume 0125 having prescribed characteristics from among a plurality of logical volumes 0125 when using the migration function to migrate data included in the logical volume 0125 to a high-speed logical volume, thereby enabling storage operation management costs to be lowered. The information stored in the configuration information (content of storage pool management table 0701, content of virtual logical volume management table 0801, and content of page maintenance table 0901) storage area 0242 will be described below using FIGS. 7 through 9.

The job access storage area 0243 stores log information of a job that accessed the arrangement unit, and prediction information related to a job that will access the arrangement unit. The information (content of job access log table, and content of job access prediction table) stored in the job access storage area will be described in detail below using FIGS. 12 and 13.

The alert storage area 0244 stores alert information notified to the user. The information stored in the alert storage area 0244 will be described in detail below using FIG. 14.

The user definition input program 0140 that is one of the rearrangement management software 0137 is for storing user-inputted information in the job definition storage area 0241 and the configuration information storage area 0242, and for instructing the virtual logical volume expansion policy specification function of the storage control program 0151 as to the page candidate that will be allocated at virtual logical volume 0127 expansion by being executed by a CPU 0131.

The user definition input program 0140 (Part corresponding to step 1 in FIG. 5) comprises a user definition input part 0201. The user definition input part 0201 displays information acquired from the job definition storage area 0241 and the configuration information storage area 0242 on the management client 0106, and stores the user-inputted information in the job definition storage area 0241 and the configuration information storage area 0242. The user definition input program 0140 also uses the information of the job definition storage area 0241 and the configuration information storage area 0242 to instruct the virtual logical volume expansion policy specification function of the storage control program 0151 that the logical volume 0125 in which the logical volume-stored page data is stored will be used as the page candidate to be allocated at virtual logical volume 0127 expansion time.

The steps executed by the user definition input program 0140 will be described in detail below using FIG. 15. The user-inputted information will also be described using FIGS. 7 through 11.

The access prediction program 0139 is for collecting information from the storage apparatus 0102, and, based on the above-mentioned collected information and user definition information, for predicting for each arrangement unit the job that will access the relevant arrangement unit next time, as well as the execution timing of this job.

The access prediction program 0139 comprises an information acquisition part 0211, a job access log determination part 0212, and a job access prediction part 0213.

The information acquisition part 0211 (part corresponding to step 2 in FIG. 5) of access prediction program 0139 is the processing part that acquires information required for job access prediction from the storage apparatus 0102. The information acquisition part 0211 acquires the information of the logical storage area configuration table stored in the memory 0122 from the storage apparatus 0102 at a specified time specified beforehand, stores the above-mentioned configuration table information in the configuration information storage area 0242, and, in addition, acquires arrangement unit access information from the storage apparatus 0102. Additionally, the information acquisition part 0211, after acquiring the above-mentioned data, sends the above-mentioned access information to the job access log determination part 0212 and runs the job access log determination part 0212. The above-mentioned configuration table information is the generic name for information in three tables, i.e., the logical volume configuration table, the virtual logical volume configuration table, and the page configuration information table, that the storage management program 0151 stored in the memory 0122.

The information acquisition part 0211, sends the above-mentioned configuration information to the job access prediction part 0213 and runs the job access prediction part 0213 subsequent to the execution of the above-mentioned job access log determination part 0212, runs the rearrangement execution part 0221 subsequent to the execution of the job access prediction part 0213, and thereafter, stands by until the above-mentioned specified time. The steps executed by the information acquisition part 0211 will be described in detail below using FIG. 16. The data stored by the information acquisition part 0211 will also be described below using FIGS. 7 through 9.

The job access log determination part 0212 (part corresponding to step 3 in FIG. 5) of access prediction program 0139 is the processing part for inferring the job that has accessed the arrangement unit in the past, which is required for job access prediction. The job access log determination part 0212 is run by the information acquisition part 0211, infers the job that accessed the arrangement part based on arrangement unit access information received from the information acquisition part 0211, a job definition acquired from the job definition storage area 0241, configuration information acquired from the configuration information storage area 0242, and job access information acquired from the job access storage area 0243, and stores the above-mentioned inferred results in the job access storage area 0243. The steps executed by the job access log determination part 0212 will be described in detail below using FIG. 17. The data stored by the job access log determination part 0212 will also be described below using FIG. 12.

The job access prediction part 0213 (part corresponding to step 4 in FIG. 5) of access prediction program 0139 is the processing part for predicting a job that will access the arrangement part in the future and the access timing thereof. The job access prediction part 0213 is run by the information acquisition part 0211, predicts the job that will access the arrangement unit and the access timing thereof based on configuration information received from the information acquisition part 0211, a job definition acquired from the job definition storage area 0241, and job access information acquired from the job access storage area 0243, and stores the result of the above-mentioned prediction in the job access storage area 0243. The steps executed by the job access prediction part 0213 will be described in detail below using FIGS. 18 and 19.

The rearrangement program 0138 (part corresponding to step 5 in FIG. 5) of rearrangement management software 0137 comprises a rearrangement execution part 0221, and determines whether rearrangement is necessary for each arrangement unit, and when the determination is that a rearrangement is necessary, carries out the rearrangement.

The rearrangement execution part 0221 is executed in accordance with either the arrival of a specified time or being run by the information acquisition part 0211, instructs the migration function of the storage management program 0151 to rearrange an arrangement unit based on job access information acquired from the job access storage area 0243 and configuration information acquired from the configuration information storage area 0242, and updates the arrangement unit information of the configuration information storage area 0242 subsequent to the end of the arrangement unit rearrangement. The steps executed by the rearrangement execution part 0221 will be described in detail below using FIG. 20.

The status display program 0141 of rearrangement management software 0137 comprises an alert display part 0231, and is for displaying a problem that has occurred in the rearrangement management software 0137 to the user. The alert display part 0231 acquires alert information with respect to a request received from the management client 0107 from the alert storage area 0244, and outputs this information to the management client 0107. The steps executed by the alert display part 0231 will be described in detail below using FIG. 21.

FIG. 7 shows the storage pool management table 0701. The storage pool management table 0701 is one of the tables that configures the configuration information storage area 0242, and is for storing the relationship between the storage pool 0126 and the logical volume 0125 that configures the storage pool.

The storage pool management table 0701 comprises columns for a storage pool ID 0711, a logical volume ID 0712, a storage hierarchy 0713, and a capacity 0714. Storage pool ID 0711 is stored for each storage pool the ID set inside the storage apparatus 0102. Logical volume ID 0712 is stored the ID that identifies the logical volume 0125 that configures the relevant storage pool. Capacity 0714 is stored and the capacity of the above-mentioned logical volume. Information acquisition part 0211 acquires these 2 ID and capacity from the storage apparatus 0102. The user definition input part 0201 is stored the information acquired from the management client 0107 in the storage hierarchy 0713.

FIG. 8 shows the virtual logical volume management table 0801. The virtual logical volume management table 0801 is one of the tables that configures the configuration information storage area 0242, and is for storing the information of the virtual logical volume 0127. The virtual logical volume management table 0801 comprises columns for a virtual logical volume ID 0811, a pool ID 0812, a page allocation hierarchy 0813, an access information acquisition date/time 0814, an access interruption arrangement hierarchy 0815, and a capacity 0816.

The information acquisition part 0211 acquires from the storage apparatus 0102 the ID set inside the storage apparatus 0102, the ID of the storage pool to which the relevant virtual logical volume belongs, and the capacity of the relevant virtual logical volume in order to uniquely identify each virtual logical volume, and stores same in the virtual logical volume ID 0811, the pool ID 0812 and a capacity 0816. The user definition input part 0201 stores information specifying the storage hierarchy acquired from the management client 0107 in the page allocation hierarchy 0813 and the access interruption arrangement hierarchy 0815.

The storage hierarchy stored in the page allocation hierarchy 0813 is utilized as a condition for retrieving a page having logical volume-stored page data from the logical volume 0125 belonging to this storage hierarchy, and the above-mentioned retrieved page is allocated when expanding the relevant virtual logical volume.

The access interruption arrangement hierarchy 0815 is utilized as a condition for selecting from the storage hierarchy the logical volume that arranges the logical volume-stored page data of the page 0128 for which access to the relevant virtual logical volume is not scheduled for some time. The information acquisition part 0211 stores the date and time at which it acquired arrangement unit access information from the storage apparatus 0102 in the access information acquisition date/time information (Year, Month, Day, Our, Minute, and Second, etc.) 0814.

FIG. 9 is a diagram showing the page management table 0901. The page management table 0901 is one of the tables that configures the configuration information storage area 0242, and is for storing page 0128 information. The page management table 0901 comprises columns for a page ID 0911, a virtual logical volume ID 0912, a storage hierarchy 0913, a page allocation date/time 0914, and a capacity 0915.

The information acquisition part 0211 acquires from the storage apparatus 0102 the ID set inside the storage apparatus 0102, the ID of the virtual logical volume 0127 to which the relevant page is allocated, the date and time at which the virtual logical volume was allocated to the relevant page, and the capacity of the relevant page in order to uniquely identify each page, and respectively stores the same in the page ID 0911, the virtual logical volume ID 0912, the page allocation date/time 0914, and the capacity 0915.

The information acquisition part 0211 stores the storage hierarchy of the logical volume 0125 in which the logical volume-stored page data of the relevant page is stored in the storage hierarchy 0913. The information acquisition part 0211 also acquires the page allocation hierarchy 0813 of the allocated virtual logical volume 0127 from the virtual logical volume management table 0801 for the page to which a storage area has been newly allocated and stores this hierarchy 0813 in the storage hierarchy 0913. The rearrangement execution part 0221 updates the storage hierarchy 0913 when rearranging the page 0128.

FIG. 10 is a diagram showing the job management table 1001. The job management table 1001 is one of the tables that configures the job definition storage area 0241, and is where the user definition input part 0201 stores job 0111 information. The job management table 1001 comprises columns for a job ID 1011, a requested performance 1012, an execution day 1013, an execution time slot 1014, a processing target base point 1015, a processing target period 1016, and a rearrangement buffer time 1017. The information of the job management table 1001 is data that the user inputted to the management client 0107. This data is stored by the user definition input part 0201. Moreover, as for the job management table, when a certain specific application controls two or more jobs, execution time information (or, execution schedule time information) that relates to the execution time from which each job is executed is stored. Moreover, each job can be executed that information of time that the access from the business server to the storage apparatus is generated will be stored when thinking that the business server accesses the storage apparatus when the job is executed.

Specifically, a name for uniquely identifying a job is stored in the job ID 1011. The requested performance with respect to a job is stored in the requested performance 1012. For example, 1 is stored in this column for a job with a high requested performance, and 2 is stored in this column for a job with a low requested performance. The job execution day and time are stored in the execution day 1013 and execution time slot 1014. In this embodiment, the schedule, i.e., the execution day and the execution time slot, on which a job is executed, is stored, but an interval, such as 72 hours after the processing target base point, may be stored.

Information specifying the data range to be processed at job execution is stored in the processing target base point 1015 and the processing target period 1016. For example, according to the information of the job management table 1001 of FIG. 10, job ID 1 is a job that processes data five days after the data was created (since the new data storage), and job ID 2 is a job that processes data one week after the data was created.

The rearrangement buffer time 1017 is information that the rearrangement execution part 0221 uses to determine whether to rearrange an arrangement unit to a higher storage hierarchy than the current storage hierarchy in a case where the next access is scheduled during the rearrangement buffer time, and/or to determine whether to rearrange an arrangement unit to a lower storage hierarchy than the current storage hierarchy in a case where the next access is not scheduled during the rearrangement buffer time. The rearrangement steps of the rearrangement execution part 0221 that makes use of the rearrangement buffer time 1017 will be described in detail below using FIG. 20.

FIG. 11 shows the job relation table 1101. The job relation table 1101 is one of the tables that configures the job definition storage area 0241, and the job relation in the volume is stored by the user definition input part 0201. The above-mentioned job relation is a set of a certain job and a job that is executed before this job. For example, in the table of FIG. 11, an example is given in which either job 2 or job 3 is executed in the virtual logical volume 1 after the execution of job 1. In addition, in a case where job 2 is executed after job 1, job 3 will be executed next. In the virtual logical volume 2, an execution order in which job 2 and job 3 are executed initially is shown. Information (it is execution order information on the job and it can be said the execution order condition of the job) that relates in the execution order between jobs that consider context/causal (relation to job generated as follows when a certain job is generated) relation between jobs is stored in the job relation table 1101 in two or more jobs that relate to a certain specific application.

Concretely, the job relation table 1101 comprises columns for a job relation ID 1111, the related volume ID 1112, a base point job relation ID 1113, and a job ID 1114.

The ID that uniquely specifies the relation of the relevant job, the ID of the virtual logical volume 0127, the job relation ID that denotes the set of jobs to be executed beforehand, and the ID that uniquely specifies the job are respectively stored in the job relation ID 1111, the related volume ID 1112, the base point job related ID 1113 and the job ID 1114. Using the data of the job relation table 1101 of FIG. 11, the user-inputted information and the flow of processing via which the user definition input part 0201 stores data from the above-mentioned inputted information in the job relation table will be specifically described below using the records of FIG. 11.

First, the user inputs to the virtual logical volume ID via the user definition input part inter-job relation information like that below.

(i) Data is created in accordance with the job ID 1. (Hereafter, job ID1 must show the job identified by job ID1. Mean the same thing by a similar expression.)
(ii) The data created by the job ID 1 is accessed by the job ID 2 and the job ID 3.
(iii) The data created by the job ID 1 and accessed by the job ID 2 is accessed by the job ID 3.

Next, the user definition input part 0201 stores the above-described user-inputted content in the job relation table 1101 as the following four records.

(i) Job Relation ID 1 Record

After the job ID 1 creates data in the virtual logical volume ID 1, the user definition input part 0201 stores a record that has the values of [1] in the related volume ID 1112, [–] in the base point job relation ID 1113, and [1] in the job ID 1114. Note that the [–] of the base point job relation ID 1113 denotes the fact that no job is executed prior to the job ID 1.
(ii) Job Relation ID 2 Record After the job ID 2 accesses the data that job ID 1 created in the virtual logical volume ID 1, the user definition input part 0201 stores a record having the values of [1] in the related volume ID 1112, [1] in the base point job relation ID 1113, and [2] in the job ID 1114. Note that the [1] of the base point job relation ID 1113 denotes that the job set executed beforehand is the job set denoted in job relation ID 1.
(iii) Job Relation ID 3 Record After the job ID 3 accesses the data that job ID 1 created in the virtual logical volume ID 1, the user definition input part 0201 stores a record having the values of [1] in the related volume ID 1112, [1] in the base point job relation ID 1113, and [3] in the job ID 1114. The concept for each column is the same as that of job relation ID 2.
(iv) Job Relation ID 5 Record After job ID 3 access the data, which job ID 1 created and job ID 2 accessed in the virtual logical volume ID 1, the user definition input part 0201 stores a record having the values of [1] in the related volume ID 1112, [2] in the base point job relation ID 1113, and 3 in the job ID 1114. The [2] of the base point job relation ID 1113 denotes the fact that the job set that was executed beforehand is the job set denoted in job relation ID 2. The job relation ID 2 is related to the set of jobs denoted by the job ID 2 and the job relation ID 1, and since the job relation ID 1 defines a relation between the job ID 1 and an empty set, the set of jobs executed beforehand by the relevant job relation is the job ID 1 and the job ID 2.

FIG. 12 is a diagram showing the job access log table 1201. The job access log table 1201 is one of the tables that configures the job access storage area 0243 and is for storing the result produced when the job access log determination part 0212 infers the job 0111 that accessed the arrangement unit. The job access log table 1201 comprises columns for an arrangement unit ID 1211, a job relation ID 1212, a storage hierarchy 1213, a relation log group ID 1214, an access log 1215, and a new data storage 1216.

The information acquisition 0211 acquires from the storage apparatus 0102 an ID for uniquely identifying a page inside the storage apparatus, and a date and time at which the relevant page was accessed for the arrangement unit ID 1211 and the access date/time 1215. For the storage hierarchy 1213, the information acquisition part 0211 acquires the storage hierarchy 0913 of the relevant page from the page management table 0901, and in addition sends same to the job access log determination part 0212 together with the above-mentioned information. When the job access log determination part 0212 stores the received above-mentioned information in the job access log table 1201, it infers the job 0111 that accessed the relevant page, and simultaneously stores the job relation ID 1212, the related log group ID 1214, and the new data storage 1216 from the inferred result. Note that a case in which the job relation ID 1212 is – denotes an access for which the job relation log could not be inferred. The steps for inferring a job 0111 that accessed a page will be described in detail below using FIG. 17.

Meanwhile the relation log group ID 1214 is information for showing that in a case where a plurality of job relation ID are inferred for an access from a certain job 0111, the job access log is the one that was inferred from the same access. Thereafter, when the job access log is obtained and it is possible to confirm that a plurality of job relation ID had been inferred, the non-relevant job access log may be deleted by referencing this relation log group ID 1214 and comparing the job access logs inferred from the same access.

The new data storage 1216 shows the likelihood of an access for the relevant job access log to store new data, and in the case of [1], denotes the likelihood that the access is for storing new data, and in the case of [0], denotes that the access is not for storing new data.

FIG. 13 is a diagram showing the job access prediction table 1301. The job access prediction table 1301 is one of the tables that configures the job access storage area 0243, and is for storing the result produced by the job access prediction part 0213 predicting the job 0111 that will access the arrangement unit in the future.

The job access prediction table 1301 comprises columns for an arrangement unit ID 1311, a job relation ID 1312, a requested performance 1313, and an access prediction date/time 1314. The job access prediction part 0213 predicts an access with respect to an arrangement unit, and respectively stores an ID for uniquely identifying the arrangement unit for which this access was predicted, the ID of the job 0111 that is to access the relevant arrangement unit, the requested performance at access time, and the date and time at which the access is predicted for the relevant arrangement unit in the arrangement unit ID 1311, the job relation ID 1312, the requested performance 1313, and the access prediction date/time 1314. The steps for predicting a job access to the arrangement unit will be described in detail below using FIG. 18.

FIG. 14 shows the alert table 1401. The alert table 1401 is for configuring the alert storage area 0244, and for the job access log determination part 0212 to store the result of a determination that either an unscheduled job 0111 has accessed an arrangement unit or the job 0111 that carried out the access has not been defined. The alert table 1401 comprises columns for an alert ID 1411 that is identifier that identifies alert, an arrangement unit ID 1412 where identifier at each arrangement that relates to alert is stored, a job ID 1413 that is identifier that identifies job that the arrangement unit (page etc.), a job relation ID 1414, and an alert date/time 1415.

Figure 15:
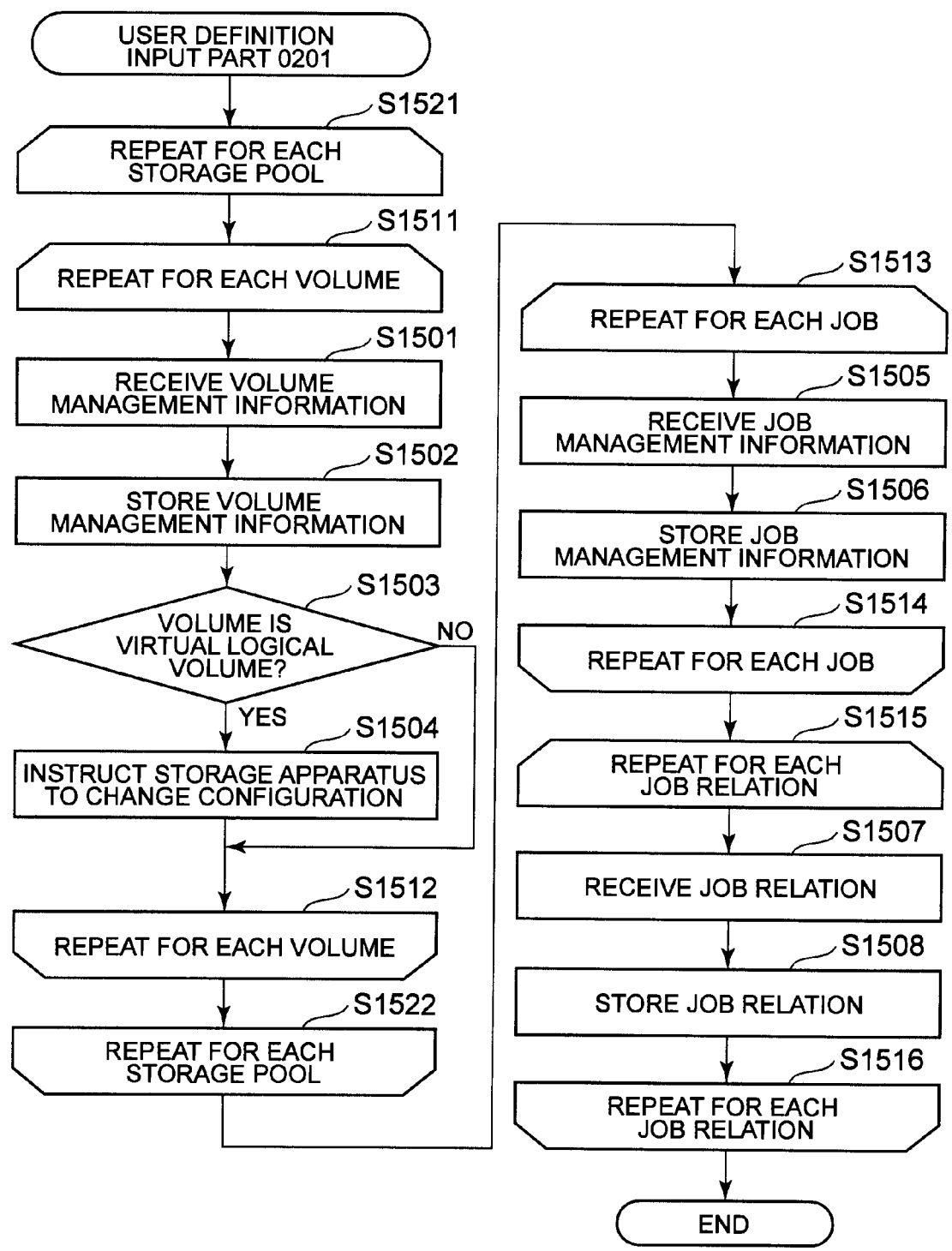
FIG. 15 is a flowchart showing the processing of a user definition input part.

FIG. 15 is a diagram showing a flowchart of a process in which the user definition input part 0201 receives and stores volume management information and a job 0111 definition from the management client 0107.

In Step S1501, the user definition input part 0201 sends the configuration information of volumes (the logical volume 0125 and the virtual logical volume 0127) to the management client 0107, and thereafter, receives the management information for the above-mentioned sent volumes from the management client 0107. It is supposed that the volume configuration information of Step S1501 is sent in the order of the logical volume 0125 and the virtual logical volume 0127. The volume management information received in Step S1501 refers to the storage hierarchy in the storage pool 0126 of the logical volume 0125, the storage hierarchy of the logical volume in which is stored the logical volume-stored page data of the page allocated when expanding the virtual logical volume 0127, and the storage hierarchy of the logical volume, which stores the logical volume-stored page data of this page when an access to an existing page of the above-mentioned virtual logical volume is not scheduled for some time.

In Step S1502, the user definition input part 0201 stores the volume management information received in Step S1501. The user definition input part 0201 stores the storage hierarchy information in the storage pool of the logical volume 0125 in the storage hierarchy 0713, and stores the storage hierarchy information written to a new page of the virtual logical volume 0127 in the page allocation hierarchy 0813.

In Step S1503, the user definition input part 0201 checks whether the volume received in Step S1501 is the virtual logical volume 0127, and in a case where the received volume is the virtual logical volume 0127, proceeds to Step S1504, and in a case where it is not, proceeds to Step S1512.

In Step S1504, the user definition input part 0201 instructs the virtual logical volume expansion policy specification function of the storage apparatus 0102 to regard the logical volume in which the logical volume-stored page data of the page is stored as the condition for the page to be allocated when expanding the relevant virtual logical volume. Specifically, the user definition input part 0201 acquires the storage pool ID 0812 of the relevant virtual logical volume from the virtual logical volume management table 0801, and acquires from the storage pool management table 0701 the logical volume ID 0712 with respect to which the storage pool ID 0711 is identical to the storage pool ID of the above-mentioned step, and, in addition, the storage hierarchy 0713 is identical to the page allocation storage hierarchy 0811 of the relevant virtual logical volume acquired in Step S1501.

Steps S1511 through S1512 execute the processing from Step S1501 through S1504 for each volume.

Steps S1521 through S1522 execute the processing from Step S1511 through S1512 for each storage pool.

In Step S1505, the user definition input part 0201 receives the management information for the job 0111 from the management client 0107.

In Step S1506, the user definition input part 0201 stores the information received in Step S1505 in the job management table 1001 of the job definition storage area 0241.

Steps S1513 through S1514 execute the processing from Step S1505 through S1506 for each job.

In Step S1507, the user definition input part 0201 receives the inter-job relation information from the management client 0107.

In Step S1508, the user definition input part 0201 stores the information received in Step S1507 in the job relation table 1101 of the job definition storage area 0241. Steps S1515 through S1516 execute the processing from Step S1507 through S1508 for each job relation.

Figure 16:
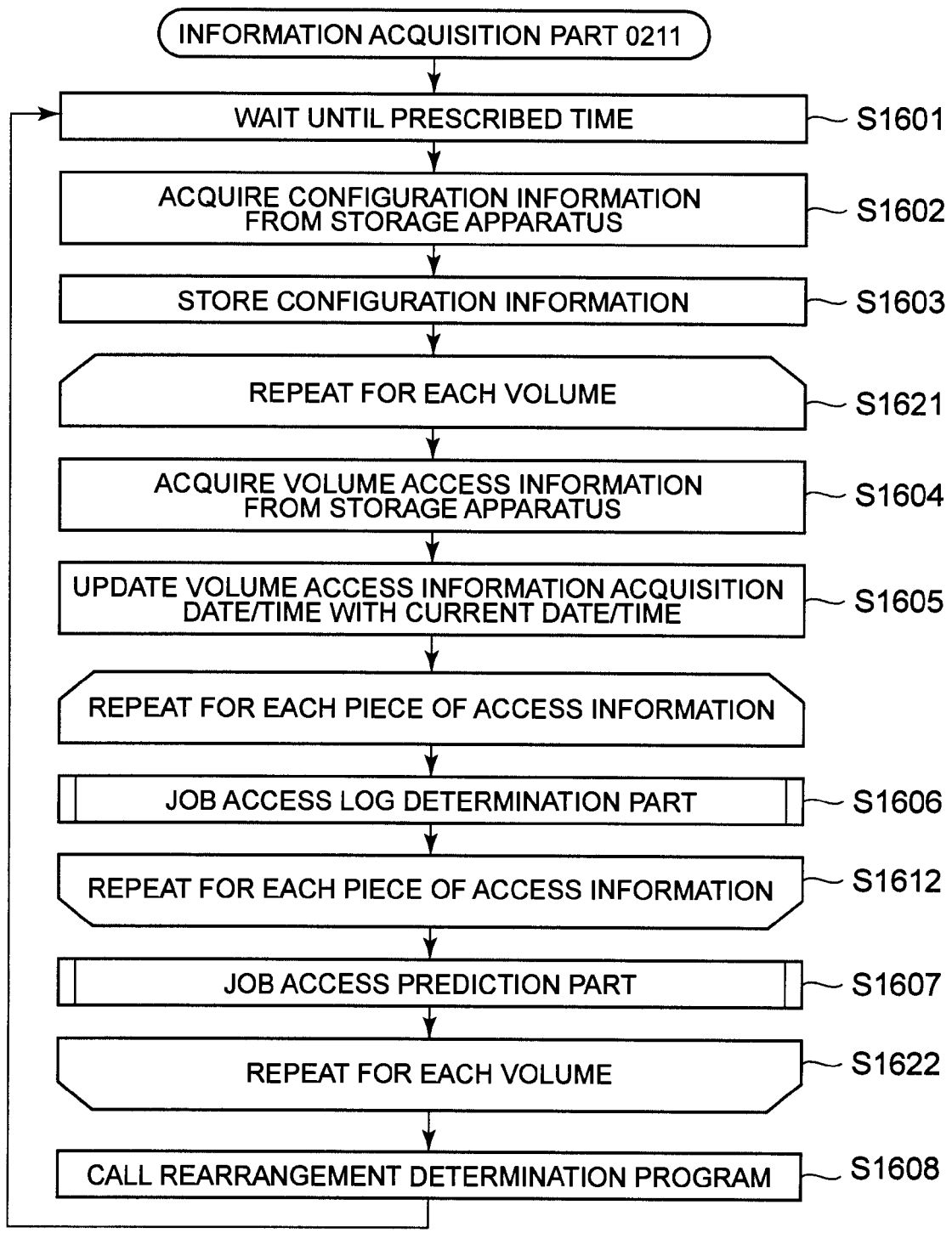
FIG. 16 is a flowchart showing the processing of an information acquisition part.

FIG. 16 is a diagram showing a flowchart of the processing of the information acquisition part 0211. The information acquisition part 0211 acquires and stores information from the storage apparatus 0102, runs the job access log determination part 0212, runs the job access prediction part 0213 subsequent to the execution of the job access log determination part 0212, and runs the rearrangement prediction program 0138.

In Step S1601, the information acquisition part 0211 waits until the specified time to acquire information from the storage apparatus 0102, and upon reaching the specified time, proceeds to Step S1602. The specified time here is not limited to a time specified by the user, but rather also denotes regular execution, such as every hour or every two hours.

In Step S1602, the information acquisition part 0211 acquires the configuration table information of the logical storage area from the storage apparatus 0102. The above-mentioned configuration table information refers to the RAID group configuration table, the logical volume configuration table, the virtual logical volume configuration table, and the page configuration table, which are stored in the memory 0122 of the storage apparatus 0102.

In Step S1603, the information acquisition part 0211 stores the configuration table information acquired from the storage apparatus 0102 in Step S1602 in the storage pool, the logical volume relation table 0701, the virtual logical volume management table 0401, and the page management table 0901 of the configuration information storage area 0242.

In Step S1604, the information acquisition part 0211 acquires the latest access information of the page 0128 that belongs to the relevant virtual logical volume from the access information table stored in the memory 0122 of the storage apparatus 0102. In this embodiment, a method that uses the latest access information is described, but the access log may also be used.

In Step S1605, the information acquisition part 0211 deploys the access information acquisition date/time 0814 of the relevant virtual logical volume to the memory 0132, and updates the access information acquisition date/time 0814 of the relevant virtual logical volume with the access information acquisition date/time.

In Step S1606, the information acquisition part 0211 sends the configuration information and the access information of the virtual logical volume 0127 to the job access log determination part 0212, and runs the job access log determination part 0212. The processing of the job access log determination part 0212 will be described in detail below using FIG. 17.

In Steps S1611 through S1612, the processing of Step S1606 is repeated for each piece of access information that was acquired from the volume acquired in Step S1604.

In Step S1607, the information acquisition part 0211 sends the access information acquisition date/time 0814 of the volume acquired in Step S1605 to the job access prediction part 0213, and runs the job access prediction part 0213. The processing of the job access prediction part 0213 will be described in detail below using FIG. 18.

In Steps S1621 through S1622, the processing from Steps S1604 through S1607 is repeated for each virtual logical volume 0127.

In Step S1608, the information acquisition part 0211 runs the rearrangement program, and thereafter, returns to Step S1601 and waits until the specified time.

Figure 17:
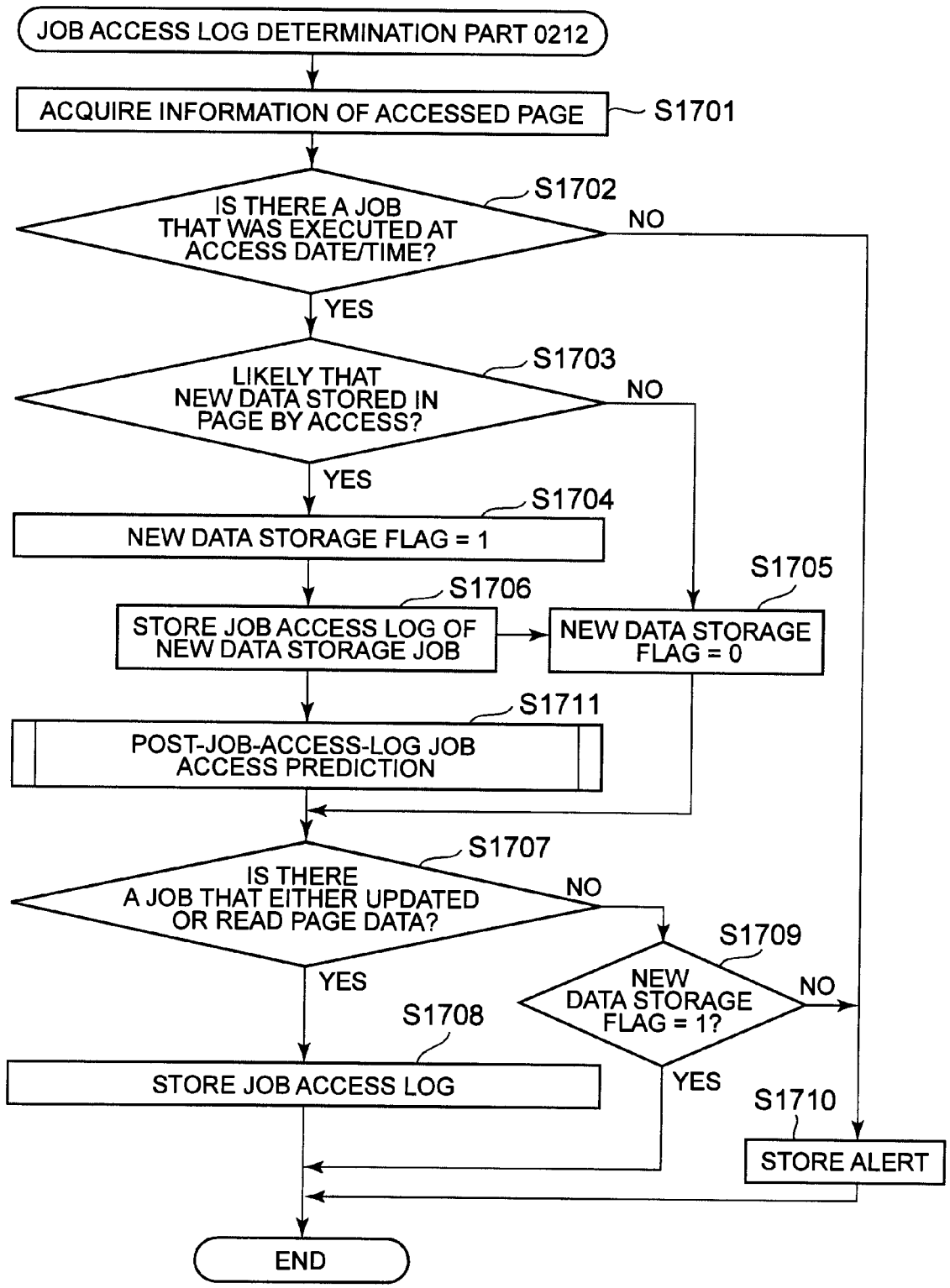
FIG. 17 is a flowchart showing the processing of a job access log determination part.

FIG. 17 is a diagram showing a flowchart of processing in which the job access log determination part 0212 infers the job 0111 that accessed the access information of the page 0128 received from the information acquisition part 0211, and stores the inference result in the job access log table 1201.

In Step S1701, the job access log determination part 0212 acquires page information from the page management table 0901 for an accessed page that comprises the relevant access information.

In Step S1702, the job access log determination part 0212 checks whether a job was executed with respect to the virtual logical volume 0127 to which the relevant page belongs at the relevant access date/time. In Step S1702, the job access log determination part 0212 internally couples the job management table 1001 and the job relation table 1101 using the job ID 1011 and the job ID 1114, and acquires a job record that satisfies both of the below conditions. The job access log determination part 0212 proceeds to Step S1703 in a case where the job record is acquirable, and proceeds to Step S1710 in a case where it is not acquirable.
(Config 1) The virtual logical volume ID stored in the related volume ID 1112 is identical to the virtual volume ID 0912 of the relevant page acquired in Step S1701.
(Config 2) The execution day 1013 and the execution time 1014 conform to the access date/time of the relevant access information.

Step S1703 is for determining whether it is likely that new data has been stored in the relevant page by the relevant access. The job access log determination part 0212 in Step S1703 infers the access that stored the new data, in Step S1706, which will be described hereinbelow, infers the job that carried out the above-mentioned access, and stores this information as a job access log in the job access log table 1201.

The reason for determining the likelihood that the relevant access stored new data is because the job that carried out the access for storing the new data is not a function of the data stored by another job but rather is conceivably the first job in a series of job relations, and is necessary for the job access prediction part 0213 to predict, based on the relevant access log, the job that will carry out an access subsequent to the relevant access. Since new data is not stored in a new page in a case where a new page has been allocated, it is supposed that the access is likely to store new data in a case where the date/time of the access to the relevant page is a period before a page other than the above-mentioned page is allocated to the above-mentioned virtual logical volume.

Since all accesses to the page 0128 always satisfy the first of the above-mentioned conditions, it is possible to determine whether the relevant access is one that stored new data by checking the second of the above-mentioned conditions. Step S1703 determines that the above-mentioned second condition is satisfied by checking the contraposition of the above-mentioned second condition.

In Step S1703, the job access log determination part 0212 acquires a page that satisfies both of the below conditions from the page management table 0901. The job access log determination part 0212 proceeds to Step S1704 in a case where a page is not acquirable, and proceeds to Step S1705 in a case where it is acquirable.
(Config 1) The virtual logical volume ID 0912 is identical to the virtual logical volume ID 0912 of the relevant page.
(Config 2) The page allocation date/time 0914 is subsequent to the allocation date/time of the relevant page, and, in addition, is prior to the access date/time of the relevant access.

In Step S1704, the job access log determination part 0212 sets 1 in the new data storage flag because it is likely that the storage of new data has been executed with respect to the relevant page.

In Step S1705, the job access log determination part 0212 sets 0 in the new data storage flag because it is not likely that the storage of new data has been executed with respect to the relevant page.

Step S1706 stores the access log from the job that stored the new data in the job access table 1201. In Step S1706, the job access log determination part 0212 infers the job 0111 that carried out the new data storage from the jobs 0111 acquired in Step S1702, and stores the job access log in the job access log table 1201 for the relevant access that was accessed from the above-mentioned job. In a case where the job 0111 that stored the new data is not included in the above-mentioned jobs that were acquired in Step S1702, the job access log determination part 0212 sets the new data storage flag to 0 without storing the job access log, and proceeds to Step S1707. Note that the job that carries out the above-mentioned new data storage is the job acquired in Step S1702 that has "–" as the base point job relation ID 1113.

Step S1711 is a step in which the job access prediction part 0213 is called, a job access to the relevant page subsequent to the job access log stored in Step S1706 is predicted, and the above-mentioned prediction result is stored in the job access prediction table 1301. The processing of Step S1711 will be described in detail using FIG. 19.

Step S1707 is a step in which either the data stored data in the relevant access is updated or the job that read out this data is inferred. The above-mentioned job inference is inferred in accordance with whether or not the access from the job acquired in Step S1702 was predicted. In Step S1707, the job access log determination part 0212 acquires from the job access prediction table 1301a record that satisfies the following conditions. The job access log determination part 0212 proceeds to Steps S1708 in a case where the above-mentioned record is acquirable, and proceeds to Step S1709 in a case where the above-mentioned record is not acquirable.

(Config 1) The arrangement unit ID 1311 is identical to the relevant page ID.

(Config 2) The job relation ID 1312 is included in the job relation ID 1111 of a record in which the base point job relation ID is not [–] from among the records acquired in Step S1702.

The above-mentioned job inference in accordance with the job access prediction makes it possible for a job, it depends on the following reason. Which will either update or read data, to be executed with respect to data that a job other than the above-mentioned job stores beforehand. Or, because it is the above-mentioned job can be considered to be a function of the job that stores the data beforehand, prediction becomes possible. In this embodiment, an access from a job that is a function of a certain job is stored beforehand in the job access prediction table 1301, and for this reason, a job that carries out either on update or a read in the relevant access is acquirable from the job access prediction table 1301.

In Step S1708, the job access log determination part 0212 stores in the job access log table 1201 the job access log for the job acquired in Step S1707 because there was access according to the above-mentioned acquired job access prediction.

Step S1709 determines whether the job that carried out the relevant access was able to be inferred. In Step S1709, the job access log determination part 0212 checks whether the new data flag is 1, and in the case of 1, the job access log determination part 0212 ends the processing, and in a case where it is not 1, proceeds to Step S1710.

In Step S1710, the job access log determination part 0212, because it was not possible to specify the job that accessed the page, stores the information in the alert table 1001 and ends the processing of the job access log determination part.

Figure 18:
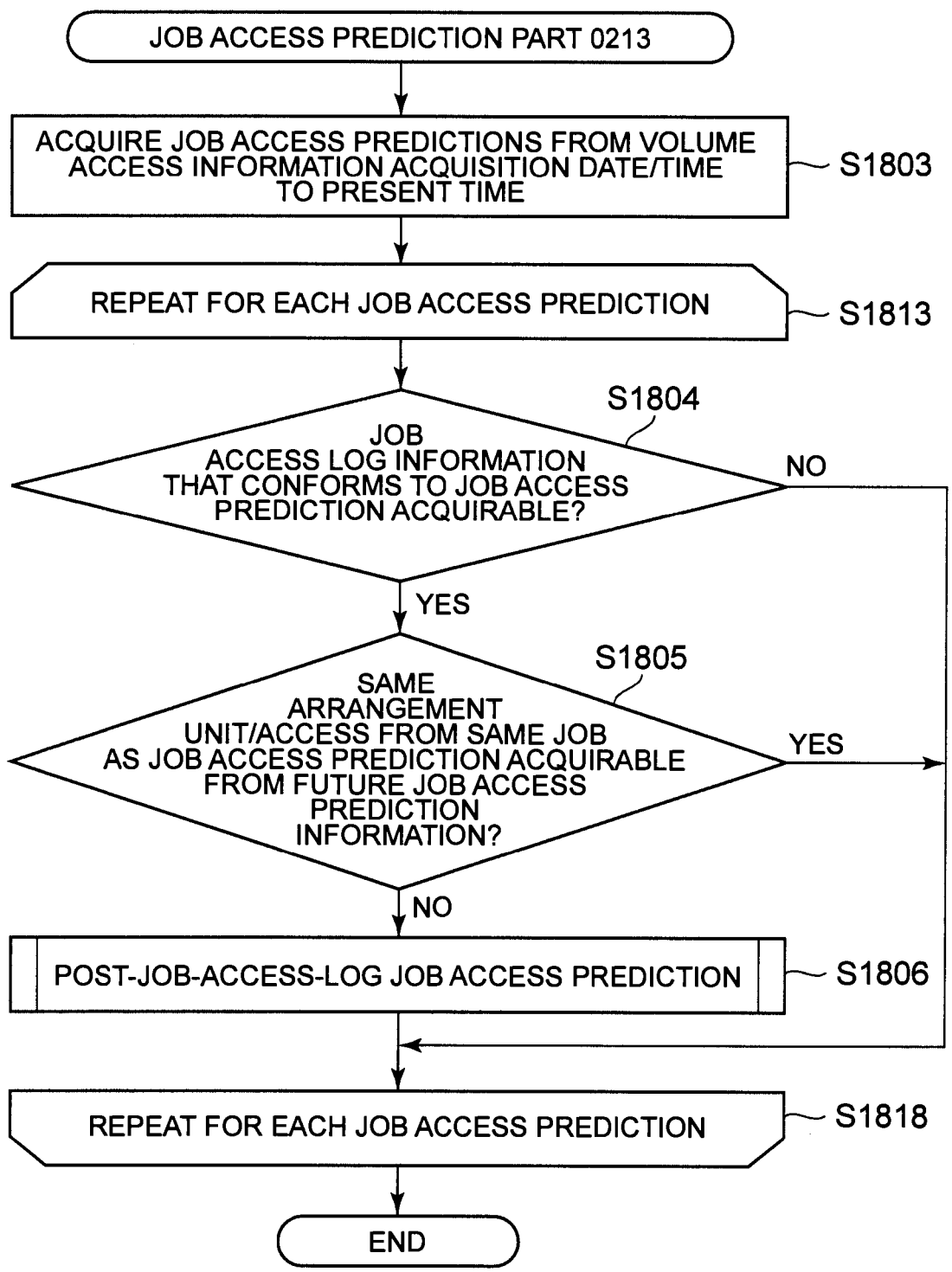
FIG. 18 is a flowchart showing the processing of a job access prediction part.

FIG. 18 is a diagram showing a flowchart of processing in which the job access prediction part 0213 predicts an access that will be generated to the arrangement unit in the future, and stores the prediction result in the job access prediction table 1301.

Step S1803 is a process for acquiring from the job access prediction table 1301 the job access for which access was predicted between the previous processing of the job access prediction part 0213 and the present.

In Step S1803, the job access prediction part 0213 internally couples the job access prediction table 1301 and the page management table 0901 using the arrangement unit ID 1311 and the page ID 0911, and acquires a record that satisfies both of the following conditions.

(Config 1) The virtual logical volume ID 0912 is identical to the ID of the relevant volume.

(Config 2) The access prediction date/time 1314 falls within the period from the access information acquisition day of the volume received from the information acquisition part 0211 and the present time.

Step S1804 acquires the job access log that conforms to the job access prediction. In a case where an access log was acquirable in this step, the prediction is determined to have been correct, and in a case where the access log was not acquirable in this step, the prediction is determined to have been incorrect and processing proceeds to the subsequent process. In Step S1804, the job access prediction part 0213 acquires from the job access log table 1201*a* job access log that satisfies all of the following conditions. The job access prediction part 0213 proceeds to Step S1805 in a case where the job access log was acquirable, and moves to Step S1814 in a case where it was not acquirable.

(Config 1) The arrangement unit ID 1211 is identical to the arrangement unit ID 1311 of the relevant job access prediction acquired in Step S1803.

(Config 2) The job relation ID 1212 is identical to the job relation ID 1312 of the relevant job access prediction.

(Config 3) The access date/time 1215 falls within the period of the access prediction date/time 1314 of the relevant job access prediction.

In this embodiment, a subsequent prediction will not change even in a case in which the job access log was not acquirable in Step S1804, that is, a case in which there was no access at the predicted timing, and when there is no access at the predicted timing, it is possible to prevent a subsequent rearrangement by deleting the future prediction for the arrangement unit for which the above-mentioned prediction was made.

Step S1805 checks whether an access with an identical job relation has been predicted for the same arrangement unit in the future as well. In Step S1805, the job access prediction part 0213 acquires from the job access prediction table 1301 a job access prediction that satisfies all of the conditions listed below. The job access prediction part 0213 proceeds to Step S1806 in a case where the job access prediction not acquirable, and moves to Step S1814 in a case where it is acquirable.

(Config 1) The arrangement unit ID 1311 is identical to the relevant job access prediction.

(Config 2) The access prediction date/time 1314 is a date/time subsequent to the access prediction date/time 1314 of the relevant job access prediction.

In Step S1806, the job access prediction part 0213 makes use of the above-mentioned job access log information acquired in Step S1804, predicts the date/time of the job access for the next job, which is defined in the job relation table 1101, and stores the prediction result in the job access prediction table 1301. The processing of the post-job-access-log job access prediction will be described in detail below using FIG. 19.

In Steps S1813 through S1814, the processing of Steps S1804 through S1806 is repeated for each job access acquired in Step S1803.

Figure 19:
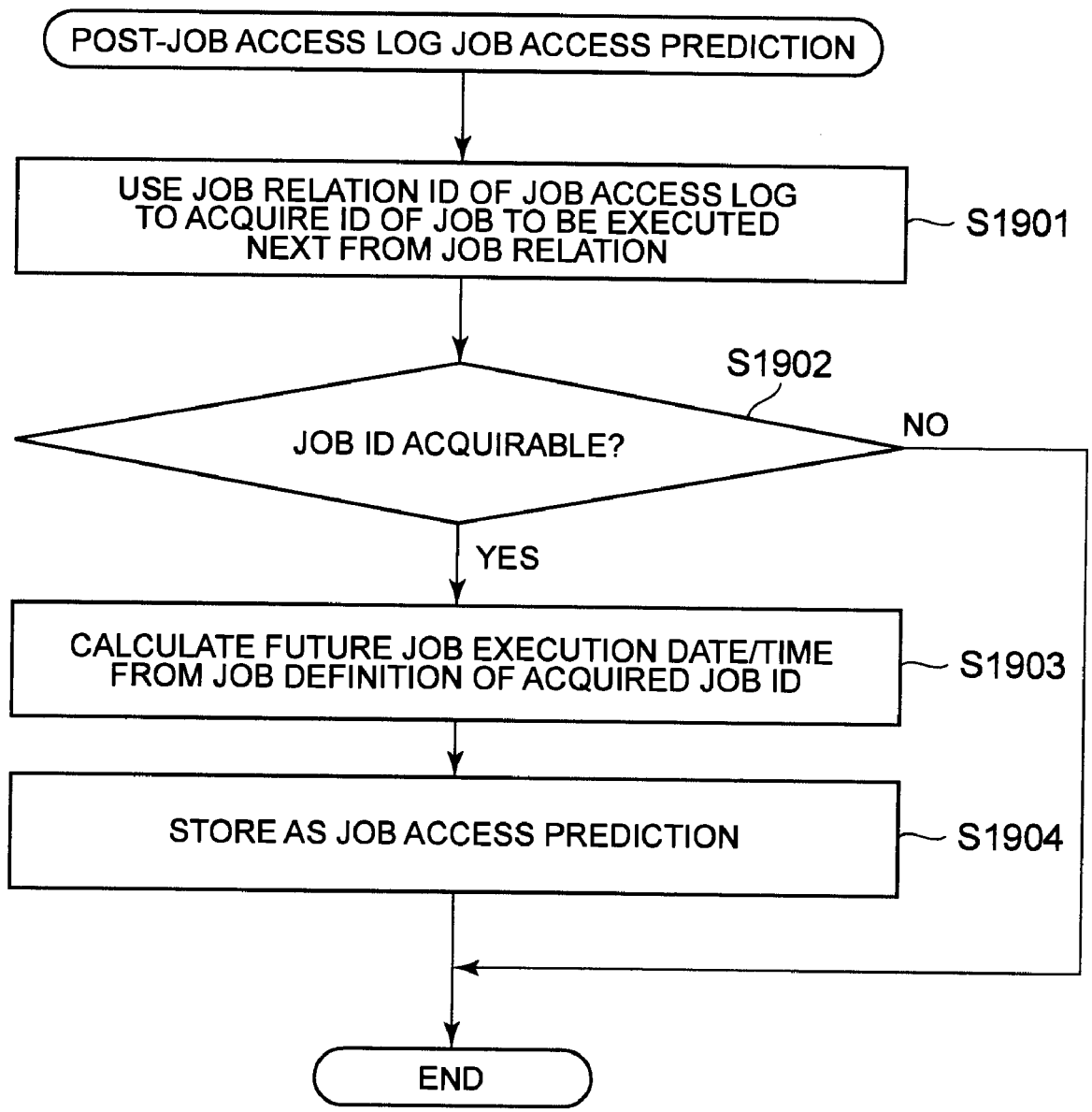
FIG. 19 is a flowchart showing a process in which the job access prediction part predicts the next job access.

FIG. 19 is a diagram showing a flowchart of processing in which the job access prediction part 0213 predicts the job 0111 that will access the arrangement unit subsequent to the access date/time of the job access log.

Step S1901 is the step for acquiring the job that is to be executed next on the job access log, which is the input of the relevant flow of processing. In Step S1901, the job access prediction part 0213 internally couples and acquires the records of the job relation table 1101 and the page management table 0901 using the related volume ID 1112 and the virtual logical volume 0912. The record to be acquired will satisfy both of the conditions listed below.

(Config 1) The page ID 0911 is identical to the arrangement unit ID 1211 of the job access log, which is the input of the relevant flow of processing.

(Config 2) The base point job relation ID 1113 is identical to the job relation ID 1212, which is the input of the relevant flow of processing.

In Step S1902, the job access prediction part 0213 proceeds to Step S1903 in a case where the job relation in Step S1901 is acquirable, and ends the relevant flow of processing in a case where the job relation is not acquirable.

In Step S1903, the job access prediction part 0213 acquires from the job management table 1001 data in which the job ID 1011 is identical to the job ID 1114 of the job relation acquired in Step S1901. The job access prediction part 0213 calculates the date/time at which the job 0111 is to be executed based on the execution day 1013 of the above-mentioned acquired job management data, the execution time slot 1014, the processing target base point 1015, and the processing target period 1016.

In Step S1904, the job access prediction part 0213 stores the job access prediction calculated in Step S1903 to the job access prediction table 1301.

The flowchart of FIG. 19 will be described in detail by giving an example. It is supposed that job access prediction will be carried out for a job access log with arrangement unit ID 1211 is [4] in the job access log table 1201 of FIG. 12.

In Step S1901, the job access prediction part 0213 acquires data in which the page ID 0911 is [4] and, in addition, the base point job relation ID 1113 is 1 from a table, which internally couples the job relation table 1101 and the page management table 0901 using the related volume ID 1112 and the virtual logical volume ID 0912. In Step S1902, the job access prediction part 0213 proceeds to Step S1903 since three records having a job relation ID 1111 of [2] are acquirable in this example. In Step S1903, the job access prediction part 0213 acquires data from the job management table 1001 in which the job ID 1011 is either [2] or [3] since the job ID of the above-mentioned acquired records are [2] and [3].

The record in which the above-mentioned acquired job ID is 2 denotes the likelihood that accesses will be carried out one week subsequent to the storage of new data based on the processing target base point 1015 and the processing target period 1016. Since the new data storage 1216 of the record of the relevant job access log is 1, it is possible to predict that there will be an access from job ID [2] one week from the access date/time of the relevant record. Further, based on the execution day 1013 and the execution time slot 1014, it is possible to predict that the next access will be between one o'clock and two o'clock on 10 Jul. 2009 (Sunday) since the execution day is Sunday from one o'clock to two o'clock. Similarly, it is possible to predict that an access from the record in which the job ID is 3 will be between one o'clock and two o'clock on 2 August (Sunday).

In Step S1904, the job access prediction part 0213 stores the above-mentioned prediction result in the job access prediction table 1301. The access predictions based on the above-mentioned prediction job ID [2] and [3] are stored in the job access prediction table 1301 of FIG. 10 as the [4] and [5] records of arrangement unit ID 1311. The job access prediction part 0213 stores [4], which is the ID of the arrangement unit for which a job access was predicted, and the respective access prediction date/times in the arrangement unit ID 1311 and the access prediction date/time. The job access prediction part 0213 stores the job relation ID 1111 of the record acquired in Step S1901 that was used in the respective prediction and the requested performance 1012 in the job relation ID 1312 and the requested performance 1313.

Figure 20:
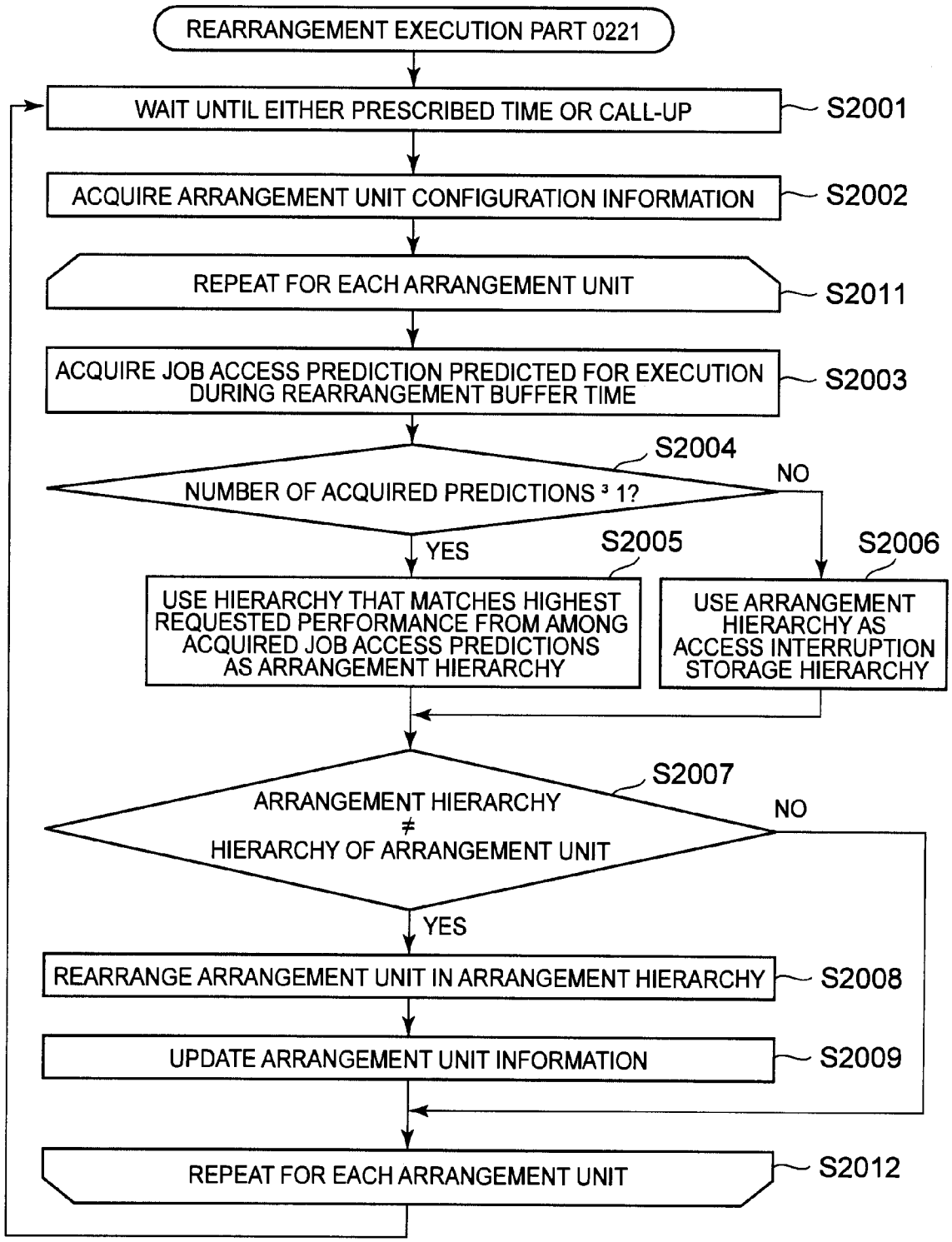
FIG. 20 is a flowchart showing the processing of a rearrangement execution part.

FIG. 20 is a diagram showing a flowchart of processing in which the rearrangement execution part 0221 determines the necessity of rearrangements for the respective arrangement units, and rearranges the arrangement unit for which rearrangement was determined to be necessary.

The rearrangement execution part 0221 determines the need for a rearrangement in a case where the storage hierarchy (arrangement unit) in which data is to be arranged in the future during the rearrangement buffer time differs from the storage hierarchy of the logical volume in which the logical volume-stored page data of the current page 0128 is stored. Note that the arrangement unit refers to a storage hierarchy that corresponds to the access with the highest requested performance from among the predicted accesses in a case where the access is predicted during the rearrangement buffer time, and refers to the access interruption arrangement hierarchy 0815, which is set in the virtual management volume 0127, in a case where it is predicted that there will not be an access during the rearrangement buffer time.

In Step S2001, the rearrangement execution part 0221 waits for either the specified time for the rearrangement determination process and the rearrangement process, or until it is called by the information acquisition part 0211, and proceeds to Step S2002 at either the specified time or upon being called. The specified time here is not limited to a time specified by the user, but rather also denotes regular execution, such as every hour.

In Step S2002, the rearrangement execution part 0221 acquires data by internally coupling the page management table 0901 and the virtual logical volume management table 0801 using the virtual logical volume ID 0912 and the virtual logical volume ID 0811. The processing of Steps S2003 through S2009 is carried out using the data acquired here.

Step S2003 is for acquiring, from among the job access predictions for an arrangement unit, a job access prediction that predicts that a job will carry out an access in the future during the rearrangement buffer time. In Step S2003, the rearrangement execution part 0221 acquires data that satisfies both of the conditions set forth below from a table that internally couples the job access prediction table 1301 and the job management table 1001 using the job relation ID 1312 and the job ID 1011.

(Config 1) The arrangement unit ID 1311 is identical to the ID of the relevant page.
(Config 2) The access prediction date/time 1314 is smaller than the date/time obtained by adding the rearrangement buffer time 0619 to the current date/time.

In Step S2004, the rearrangement execution part 0221 proceeds to Step S2005 in a case where one or more job access predictions were acquirable in Step S2003, and moves to Step S2006 in a case where not even one job access prediction was acquirable.

In Step S2005, the rearrangement execution part 0221 uses the storage hierarchy that matches the highest requested performance 1313 from among the job access predictions acquired in Step S2003 as the arrangement unit.

In Step S2006, the rearrangement execution part 0221 uses the access interruption arrangement hierarchy 0815 of the relevant page acquired in Step S2002 as the arrangement unit.

In Step S2007, the rearrangement execution part 0221 compares the storage hierarchy 0913 of the logical volume 0125 in which the logical volume-stored page data of the relevant page is stored to the arrangement hierarchy decided in either Step S2005 or Step S2006. The rearrangement execution part 0221 proceeds to Step S2008 when the above-mentioned comparison results differ, and ends the processing for the relevant page when these results are identical.

In Step S2008, the rearrangement execution part 0221 acquires from the storage pool management table 0701a logical volume ID that satisfies both of the conditions set forth below.

(Config 1) The storage pool ID 0711 is identical to the storage pool ID 0812 of the relevant page.
(Config 2) The storage hierarchy 0713 is identical to the arrangement hierarchy.

The rearrangement execution part 0221 sends the storage apparatus 0102 an instruction to rearrange the relevant page to an arbitrary logical volume 0125 of the logical volumes denoted by the above-mentioned acquired one or plurality of logical volume IDs, and rearranges the relevant page using the migration function that has by storage apparatus. In this embodiment, the rearrangement execution part 0221 rearranges page 0128 to an arbitrary logical volume 0125, but a logical volume 0125 may also be selected in accordance with the performance and utilization capacity of the respective logical volumes.

In Step S2009, the rearrangement execution part 0221 upgrades the storage hierarchy 0913 column of the record denoting the relevant page in the page management table 0901 to the value of the arrangement hierarchy after the storage apparatus 0102 has finished the rearrangement.

Figure 21:
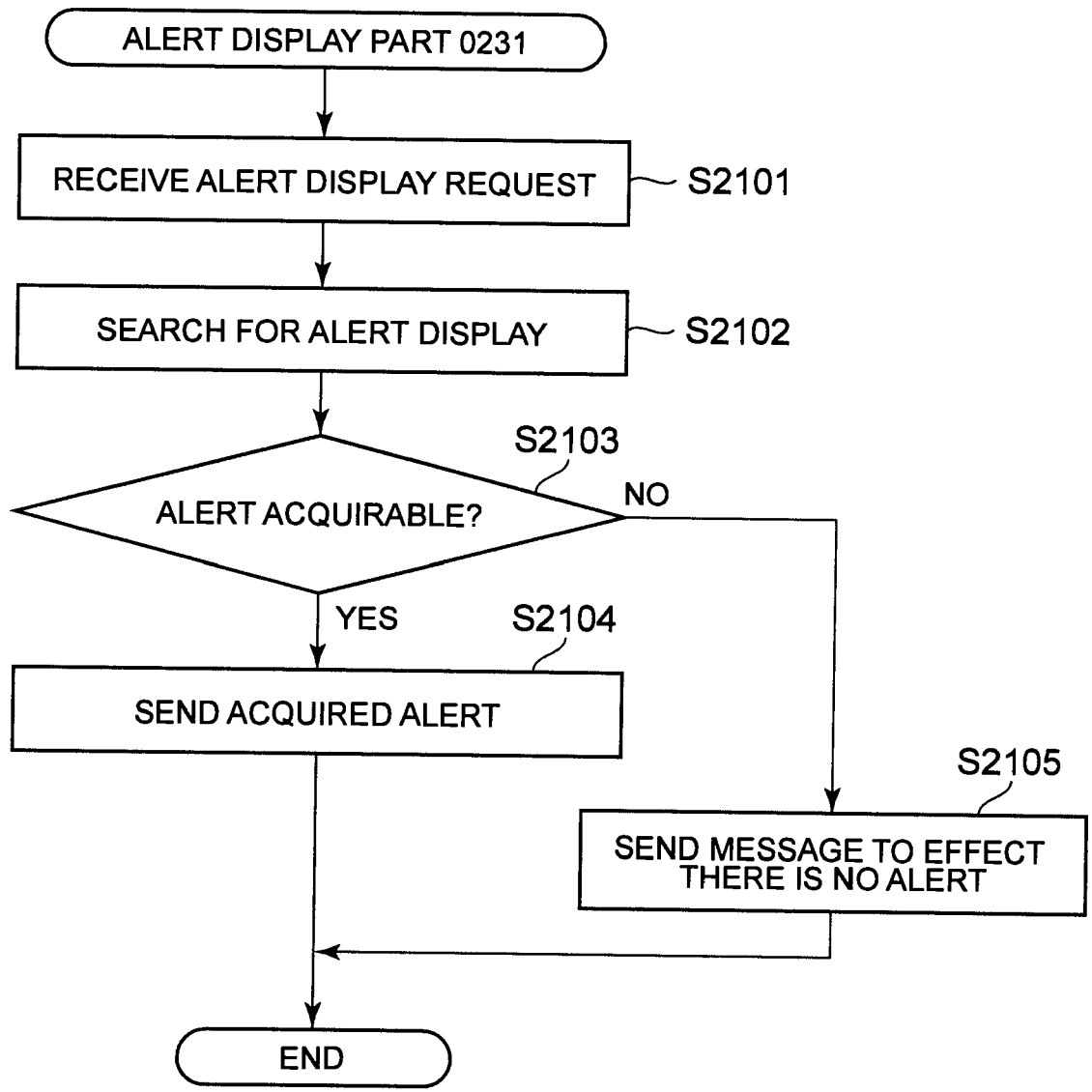
FIG. 21 is a flowchart showing the processing of an alert display part.

In Steps S2011 through S2012, the processing from Step S2001 through S2009 is executed for each page unit. FIG. 21 shows the flow of processing for displaying an alert in accordance with an alert display request that the alert display part 0231 received from the management client 0107.

In Step S2101, the alert display part 0231 receives an alert display request from the management client 0107.

In Step S2102, the alert display part 0231 acquires data from the alert table 1001.

In Step S2103, the alert display part 0231 proceeds to Step S2104 in a case where an alert was acquirable in Step S2102, and moves to Step S2105 in a case where an alert was not acquirable.

In Step S2104, the alert display part 0231 sends the alert information acquired in Step S2102 to the management client 0107.

In Step S2105, the alert display part 0231 sends a message to the management client 0107 to the effect that there is no alert.

Information on the execution time of a plurality of jobs and information on the order of executing the respective jobs input from management client to memory of management server. are stored. When the data of the page whose execution time of job is time that the job is executed on the business server, and job is the arrangement unit of the storage apparatus is used, the execution time of this job is thought to be time that the job accesses the page of storage apparatus. Information on the order of executing the respective jobs is showing of the relation to the job executed as follows when a certain job is executed. Moreover, the identifier that identifies the access time that the job accessed the page of the storage apparatus by the business server and the same accessed page is acquired from the storage apparatus, and the management server is stored in the memory.

The management server decides a job concerned the same accessed identifier on the page and to correspond by using the relation with execution time information on the access time and information on the order of executing the respective jobs. Next, the management server decides the correspondence of the above-mentioned accessed identifier on the page and execution order information on a job concerned from the identifier on the page that the job accessed, the correspondence of a job concerned, and execution order information between jobs. In addition, the job that will be executed for the same accessed page next time is decided from execution order information between correspondence with execution order information on an identifier on the same accessed page and information on the order of executing the respective jobs. In addition, the execution time of the job that will be executed next time is decided from execution time information on the job that will be executed decided next time and information on the order of executing the respective jobs, and it can again be an execution time of this job that decides it that the job that will be executed next time is time of the management server to access the page of the storage apparatus.

Because the management server can know can know time that the job is executed next, that is, time that the job accesses the page of the storage apparatus next, time zone that this access is not executed becomes possible for time zone that the access is executed again by moving the data of the page of the storage apparatus that this job accesses to the memory with slow access speed to move the data of this page to the memory with fast access speed, and for the storage apparatus to return the data that the job of the business server accesses at high speed by using execution time information on the job it.

Next, the arrangement unit becomes a logical volume on the page in the described embodiment.

Second Embodiment

A second embodiment will be described below by giving an example of an embodiment of the present invention. There are two major points of difference with the first embodiment: (1) the arrangement unit is a logical volume rather than a page; and (2) a volume related to a job is a logical volume group, which is a set of logical volumes instead of virtual logical volumes. The second embodiment will be explained below using the drawings.

FIG. 22 shows a logical volume group management table 2201. The logical volume group management table of FIG. 22 is a variation of the virtual logical volume management table of FIG. 8. This is due to the fact that the job-related volume has been changed from a virtual logical volume to a logical volume group.

The logical volume group management table 2201 is one of the tables that configures the configuration information storage area 0242, and is for storing information of a logical volume group that denotes a set of either one or a plurality of logical volumes. The logical volume group management table 2201 has columns for a logical volume group ID 2211 and an access interruption arrangement hierarchy 2212. The user definition input part 0201 acquires from the management client 0107 an ID for uniquely identifying a logical volume group, and a storage hierarchy for arranging the above-mentioned logical volume when an access to the logical volumes 0125 configuring the relevant logical volume group is not schedule for some time, and stores same in the logical volume group ID 2211 and the access interruption arrangement hierarchy 2212.

FIG. 23 shows a logical volume management table 2301. The page management table 0901 of FIG. 9 has been changed to the logical volume management table 2301 of FIG. 23 because the arrangement unit was changed from the page to the logical volume. The logical volume management table 2301 is one of the tables that configures the configuration information storage area 0242, and is for storing information about a logical volume 0125. The logical volume management table 2301 has columns for a logical volume ID 2311, a storage hierarchy 2312, a logical volume group ID 2313, a capacity 2314, an access information acquisition date/time 2315, and an allocation-destination business server 2316.

The information acquisition part 0211 acquires from the storage apparatus 0102 an ID for uniquely identifying a logical volume 0125, the capacity of the relevant logical volume, and the ID that uniquely identifies the business server to which the logical volume 0125 has been allocated, and respectively stores same in the logical volume ID 2311, the capacity 2314, and the allocation-destination business server 2316 of the logical volume management table 2301. The user definition input part 0201 also acquires from the management client 0107 the storage hierarchy of the relevant logical volume and the logical volume group ID, and stores same in the storage hierarchy 2312 and the logical volume group ID 2313. The user definition input part 0211 stores the date and time at which the arrangement unit access information was acquired in the access information acquisition date/time 2315.

The job management table of FIG. 10 is used in second embodiment as well as first embodiment. The job relation table 1101 of FIG. 11 is the same as in the first embodiment. However, in the first embodiment, the ID of the virtual logical volume is stored in the related volume ID 1112, but in the second embodiment, the ID of the logical volume group is stored in the related volume ID 1112.

The job access log table 1201 of FIG. 12 is the same as that of the first embodiment. However, the location where page was entered has become the logical volume 0125. The definition of the storage hierarchy 1213 is such that the information acquisition part 0211 acquires the storage hierarchy 2312a of the relevant arrangement unit (a logical volume) from the logical volume management table 2301a, and sends same to the job access log determination part 0212 together with the above-mentioned information. As for job access forecast table 1301 of FIG. 13, it is used things except the use of a logical volume as the arrangement unit in second embodiment as well as first embodiment.

As for job access forecast table 1401 of FIG. 14, it is used things except the use of a logical volume as the arrangement unit in second embodiment as well as first embodiment.

The following portions differ from the flowchart showing the processing of the user definition input part 0201 in FIG. 15 and the explanation thereof.

In Step S1501, the user definition input part 0201 sends volume (logical volume 0125 and logical volume group) information to the management client 0107, and receives the volume management information that was sent. In Step S1501, it is supposed that the volume information is sent and the management information is received in the order of the logical volume group and the logical volume 0125. The volume management information received in Step S1501 refers to the storage hierarchy that arranges the above-mentioned logical volumes, the storage hierarchy of the logical volume 0125, and the ID of the logical volume group when an access to the logical volume 0125 of the logical volume group is not scheduled for some time.

In Step S1502, the user definition input part 0201 stores the volume management information received in Step S1501. The storage hierarchy information of the logical volume group is stored in the access interruption arrangement hierarchy 2212. The information of the storage hierarchy of the logical volume 0125 is stored in the storage hierarchy 2312a, and the ID of the logical volume group is stored in the logical volume group ID 2313a. Steps S1501 and S1502 are repeated for each volume (logical volume 0125 and logical volume group) (Steps S1511 and S1512).

The flowchart showing the processing of the information acquisition part 0211 of FIG. 16 is the same as that of the first embodiment. However, the steps below change to the following processing.

In Step S1602, the information acquisition part 0211 acquires the configuration information of the logical volume shown in FIG. 9 from the storage apparatus 0102.

In Step S1603, the information acquisition part 0211 stores the configuration information acquired from the storage apparatus 0102 in Step S1602 in the logical volume configuration information table.

In Step S1604, the information acquisition part 0211 acquires the last access information of the logical volume 0125 from the storage apparatus 0102. In this embodiment, a method that uses the last access information is described, but the access log may also be used.

In Step S1605, the information acquisition part 0211 uses the acquisition date/time of the access information to update the access information acquisition date/time 2315 of the relevant logical volume for which the last access information was acquired in Step S1604.

In Step S1606, the information acquisition part 0211 sends the access information and the configuration information of the logical volume 0125 to the job access log determination part 0212 and runs the job access log determination part 0212. The processing of the job access log determination part 0212 will be described in detail below using FIG. 24.

The processing of Step S1602 is repeated for each access acquired from the volume acquired in Step S1604 (Steps S1611 and S1612).

In Step S1607, the information acquisition part 0211 sends the access information acquisition date/time 0814 of the volume acquired in Step S1605 to the job access prediction part 0213 and runs the job access log prediction part 0213. The processing from Step S1604 through Step S1607 is repeated for each logical volume 0125 (Steps S1621 and S1622)

Figure 24:
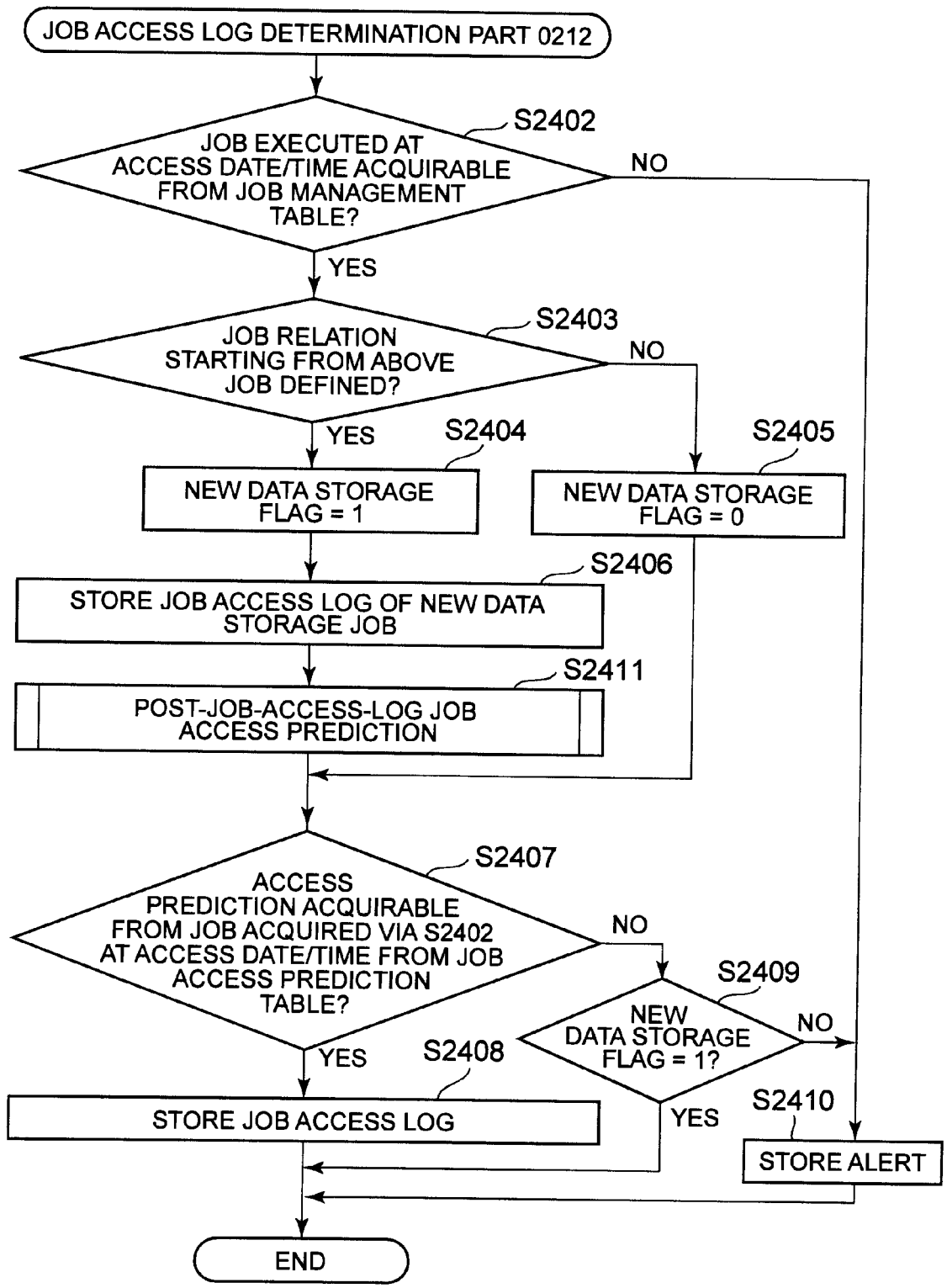
FIG. 24 is a flowchart showing the processing of a job access log determination part of the second embodiment.

FIG. 24 is a flow chart used by second embodiment in place of FIG. 17 used by first embodiment. It is a diagram showing a flowchart of processing in which the job access log determination part 0212 infers the job 0111 that accessed the access information of the logical volume 0125 received from the information acquisition part 0211, and stores the inference result in the job access log table 1201.

In Step S2402, the job access log determination part 0212 checks whether there is a job that was executed for the relevant logical volume 0125 at the relevant access date/time. In Step S2402, the job access log determination part 0212 internally couples the data of the job management table 1001 and the job relation table 1101 using the job ID 1011 and the job ID 1114, and acquires the information of the job that satisfies both of the conditions set forth below. The job access log determination part 0212 proceeds to Step S2403 in a case where the job information is acquirable, and moves to Step S2410 in a case where it is not acquirable.

(config 1) The related volume ID 1112 is identical to the relevant logical volume ID 2311.

(config 2) The execution day 1013 and the execution time 1014 conform to the access date/time of the relevant access information.

Step S2403 is for confirming whether the relevant access is the result of a job 0111 that indicates the start of a new job dependence relation with respect to the relevant logical volume by checking for the presence or absence of a series of jobs that start from the above-mentioned job acquired in Step S2402. Because the start of a job dependence relation is brought on by the storage of new data, the above-mentioned confirmation flag is called the new data storage. Specifically, confirmation is performed by acquiring a job that satisfies all of the following conditions from the job relation table 1101. The job access log determination part 0212 proceeds to Step S2404 in a case where a job is acquirable, and moves to Step S2405 in a case where a job is not acquirable.

(config 1) The related volume ID 1112 is identical to the ID of the relevant logical volume.

(config 2) The base point job relation ID 1113 is "–".

(config 3) The job ID 1114 is included in the job ID acquired in Step S2402.

In Step S2404, the job access log determination part 0212 enters 1 in the new data storage flag because there is a likelihood that a job 0111 that indicates the start of a new job dependence relation has been executed.

In Step S2405, the job access log determination part 0212 enters 0 in the new data storage flag because there is no likelihood that a job 0111 that indicates the start of a new job dependence relation has been executed.

In Step S2406, the job access log determination part 0212 stores the job access log for the job 0111 acquired in Step S2403 in the job access log table 1201. The job access log determination part 0212 stores 1 in the new data storage 1216 at this time.

Step S2411 is for calling the job access prediction part 0213, predicting a job access to the relevant page subsequent to the job access log acquired in Step S2406, and storing the above-mentioned prediction result in the job access prediction table 1301. The processing of Step S2411 will be described in detail that is similar to the processing of FIG. 19 explained by first embodiment. However, the arrangement unit is processed as a logical volume.

Step S2407 is for determining a relevant access job other than the job that wrote the new data stored in Step S2406, that is, a job that either updates or reads the stored data. Since the above-mentioned job processes data stored beforehand, this job may be regarded as processing data that was stored by a certain job beforehand. That is, the above-mentioned job may be seen as dependent on the certain job. In this embodiment, since an access from the job that is dependent on the certain job is stored beforehand in the job access prediction table 1301, the job that carries out the relevant access should be acquirable from the job access prediction table 1301.

In Step S2407, the job access log determination part 0212 acquires from the job access prediction table 1301 the job access prediction that predicts an access from the job acquired in Step S2402 at the access date/time of the relevant access. The job access log determination part 0212 proceeds to Step S2408 in a case where the job access prediction was acquirable, and moves to Step S2423 in a case where it was not acquirable.

In Step S2408, the job access log determination part 0212 stores the job access log for the job acquired in Step S2407 because there was an access according to the above-mentioned acquired job access prediction.

In Step S2409, the job access log determination part 0212 checks whether the new data flag is 1, ends the processing of the job access log determination part 0212 in a case where it is 1, and proceeds to Step S2410 in a case where the new data flag is not 1. This is because in a case where the new data flag is 1, the job access log determination part 0212 infers that the job that stores the new data is the job that carries out the relevant access, and in a case where the new flag data is 0, the job access log determination part 0212 performs a process that raises an alert since it was not able to infer a job.

In Step S2410, the job access log determination part 0212 stores the information in the alert table 1001 and ends the processing of the job access log determination part because it was not able to specify a job that had accessed the page.

In this embodiment, the job access log determination part 0212 uses the access information of the logical volume 0125 acquired from the storage apparatus 0102, the information of the job management table 1001 and the job relation table 1101 to infer the job 0111 that accessed the logical volume 0125. Instead, the job access log determination part 0212 may couple the business server 0101 to the LAN 0106, and acquire a map of the job 0111 and the access to the logical volume 0125 when the management server 0103 acquires from the business server 0101 information about the business server access destination and information about the job that issued the access.

The flowchart that shows the processing of the job access prediction part 0213 of FIG. 18 is the same as that of the first embodiment. However, in Step S1801, the job access prediction part 0123 acquires data that satisfies all of the following conditions from the job access log table 1201.

(config 1) The arrangement unit ID 1211 is identical to the ID of the relevant logical volume.
(config 2) The new data storage 1216 is 1.
(config 3) The access date/time 1215 is within the period from the volume access information acquisition day received from the information acquisition part 0211 to the present time.

This process is for acquiring from the job access log stored subsequent to the previous execution of the job access prediction part 0213 the job access log of the job that is storing the new data.

In Step S1803, the job access prediction part 0213 acquires from the job access prediction table 1301 data in which the arrangement unit ID 1311 is identical to the ID of the relevant logical volume, and, in addition, the access prediction date/time 1314 falls within the period from the access information acquisition day of the volume sent from the information acquisition part 0211 to the present time. Step S1803 is a process for acquiring a job access prediction for which the access prediction date/time 1314 elapsed subsequent to the previous execution of the job access prediction part 0213.

The flowchart that shows the processing of the rearrangement execution part 0221 of FIG. 20 is the same as that of the first embodiment. However, the rearrangement execution part 0221 determines the need for a rearrangement in a case where the storage hierarchy (arrangement hierarchy), which should be arranged during the future rearrangement buffer time, differs from the storage hierarchy of the logical volume 0125. Note that the arrangement hierarchy refers to a storage hierarchy that corresponds to the access with the highest requested performance from among the predicted accesses in a case where the access is predicted during the rearrangement buffer time, and refers to the access interruption arrangement hierarchy 2212, which is set in the logical volume group, in a case where it is predicted that there will not be an access during the rearrangement buffer time.

In Step S2001, the rearrangement execution part 0221 waits either for the specified time of the rearrangement determination process and rearrangement process or until called by the information acquisition part 0211, and proceeds to Step S2002 at either the specified time or when called. The specified time here is not limited to a time specified by the user, but rather also denotes regular execution, such as every hour.

In Step S2002, the rearrangement execution part 0221 acquires the data of the logical volume management table 2301 and the logical volume group management table 2201 by internally coupling the logical volume group ID 2313 and the logical volume group ID 2211. The rearrangement execution part 0221 uses the data acquired here to carry out the processing of Steps S2003 through S2009.

In Step S2003, the rearrangement execution part 0221 acquires data that satisfies both of the below conditions from a table that internally couples the job access prediction table 1301 and the job management table 1001 using the job relation ID 1312 and the job ID 1011.

The arrangement unit ID 1311 is identical to the ID of the relevant logical volume.
The access prediction date/time 1314 is smaller than the date/time obtained by adding the rearrangement buffer time 0619 to the current date/time.

Step S2003 is for acquiring, from among the job access predictions for the arrangement unit, a job access prediction, which predicts a job that will carry out an access in the future during the rearrangement buffer time.

In Step S2004, the rearrangement execution part 0221 proceeds to Step S2005 in a case where one or more job access predictions were acquirable in Step S2003, and moves to Step S2006 in a case where not even one job access prediction was acquirable.

In Step S2005, the rearrangement execution part 0221 uses the storage hierarchy that matches highest requested performance 1313 from among the job access predictions acquired in Step S2003 as the arrangement hierarchy.

In Step S2006, the rearrangement execution part 0221 uses the access interruption arrangement hierarchy 2212 of the relevant logical volume acquired in Step S2002 as the arrangement hierarchy.

In Step S2007, the rearrangement execution part 0221 compares the storage hierarchy 0913 of the relevant logical volume to the arrangement hierarchy decided in either Step S2005 or Step S2006. The rearrangement execution part 0221 proceeds to Step S2008 when the above-mentioned comparison results differ, and ends the processing for the relevant logical volume when these results are identical.

In Step S2008, the rearrangement execution part 0221 acquires from the logical volume management table 2301a logical volume ID that satisfies both of the conditions set forth below.
(config 1) The allocation-destination business server 2316a is [–].
(config 2) The storage hierarchy 2312a is identical to the arrangement hierarchy.

Then, the rearrangement execution part 0221 sends the storage apparatus 0102 an instruction to rearrange the relevant logical volume to an arbitrary logical volume of either one or a plurality of the above-mentioned logical volume IDs.

In Step S2009, after the storage apparatus 0102 has finished the rearrangement, the rearrangement execution part 0221 upgrades the data denoting the relevant logical volume, the above-mentioned logical volume that was used as the rearrangement destination, and both storage hierarchy 2312 columns in the logical volume management table 2301.

In Steps S2011 through S2012, the processing from Step S2001 through S2009 is executed for each logical volume unit.

Third Embodiment

A third embodiment will be described by giving an example. That displays a configuration change in the storage hierarchy of the virtual logical volume based on the result of an access to a page in the first embodiment while showing the differences with the first embodiment. Note that in this embodiment a configuration change in the storage hierarchy of the virtual logical volume is described in a case where the arrangement unit is a page, but a configuration change in a logical volume group in a case where the arrangement unit is a logical volume as in the second embodiment may be described in the same way.

The two major differences between this embodiment and the first embodiment are as follows:
(1) A change for displaying the change of configuration to the client; and
(2) A change for storing a configuration log of the virtual logical volume.

Figure 25:
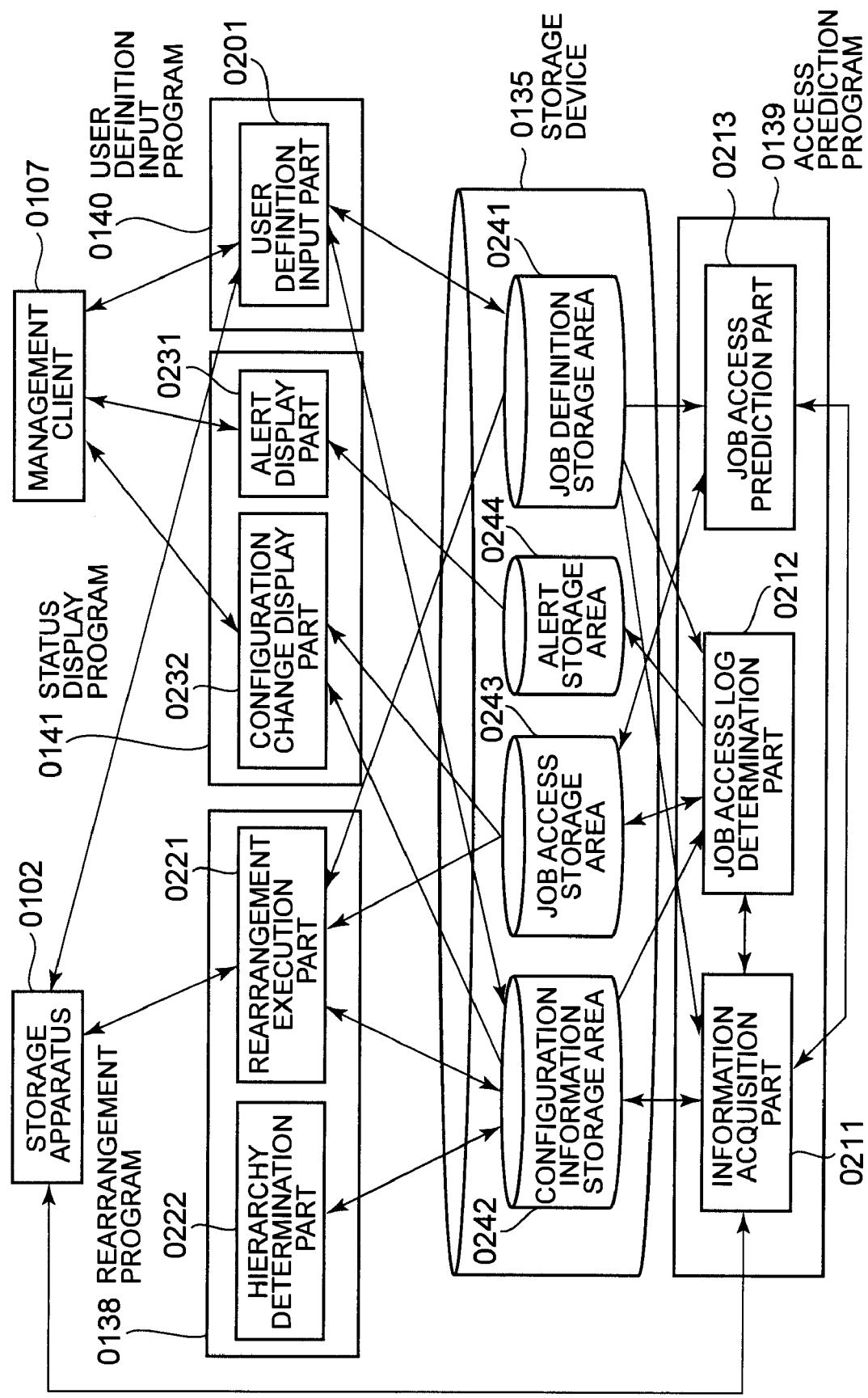
FIG. 25 is a diagram showing rearrangement management software modules of a third embodiment.

FIG. 25 shows the rearrangement management software modules. That is a configuration change display part 0232 has been added to the status display program 0141 and a hierarchy determination part 0222 has been added to the rearrangement program 0138 compared to FIG. 6. An explanation of the above-mentioned added modules will be appended to the explanation of FIG. 6 in the first embodiment. Further, the operation of the rearrangement execution part 0221, which is changed by the added modules, will also be explained.

The configuration change display part 0232 is run in accordance with a request from the management client 0107 to display a configuration change, and is a module for receiving via the above-mentioned request a virtual logical volume 0127 and a display period, and for displaying on the management client 0107 a configuration change of the received relevant virtual logical volume during the received relevant time period. The steps executed by the configuration change display part 0232 will be described in detail below using FIG. 28. An example of a display screen will also be described below using FIG. 29.

In addition to the explanation of FIG. 6 in the first embodiment, the rearrangement execution part 0221 calls the hierarchy determination part 0222 subsequent to the end of rearrangement processing for the arrangement unit, and waits after the execution of the hierarchy determination part 0222. The steps that have changed in the third embodiment will be described in detail below using FIG. 28.

The hierarchy determination part 0222 is run by the rearrangement execution part 0221, and is a module for storing the storage hierarchy configuration of the virtual logical volume 0127 in the configuration information storage area 0242. The information stored by the hierarchy determination part 0222 will be described below using FIG. 26, and the steps executed by the hierarchy determination part 0222 will be described in detail below using FIG. 27.

FIG. 26 is a diagram showing a virtual logical volume hierarchy log table 2601. The virtual logical volume hierarchy log table 2601 is one of the tables that configures the configuration information storage area 0242, and is for storing the storage hierarchy information of the virtual logical volume 0127. The virtual logical volume hierarchy log table 2601 has columns for a virtual logical volume ID 2611, a storage hierarchy 2612, a capacity 2613, and a configuration confirmation date/time 2614.

The hierarchy determination part 0222 acquires from the storage apparatus 0102 the ID set inside the storage apparatus for uniquely identifying the respective virtual logical volumes, and stores same in the virtual logical volume ID 2611.

The hierarchy determination part 0222 calculates stores hierarchy name for uniquely identifying a storage hierarchy that configures the relevant virtual logical volume in same in the storage hierarchy 2612.

The hierarchy determination part 0222 calculates the capacity of the relevant storage hierarchy of the relevant virtual logical volume, and it stores in the capacity 2613.

The hierarchy determination part 0222 stores the date and time of the above-mentioned calculations in the configuration confirmation date/time 2614. The above-mentioned calculation method will be described using FIG. 27.

Figure 27:
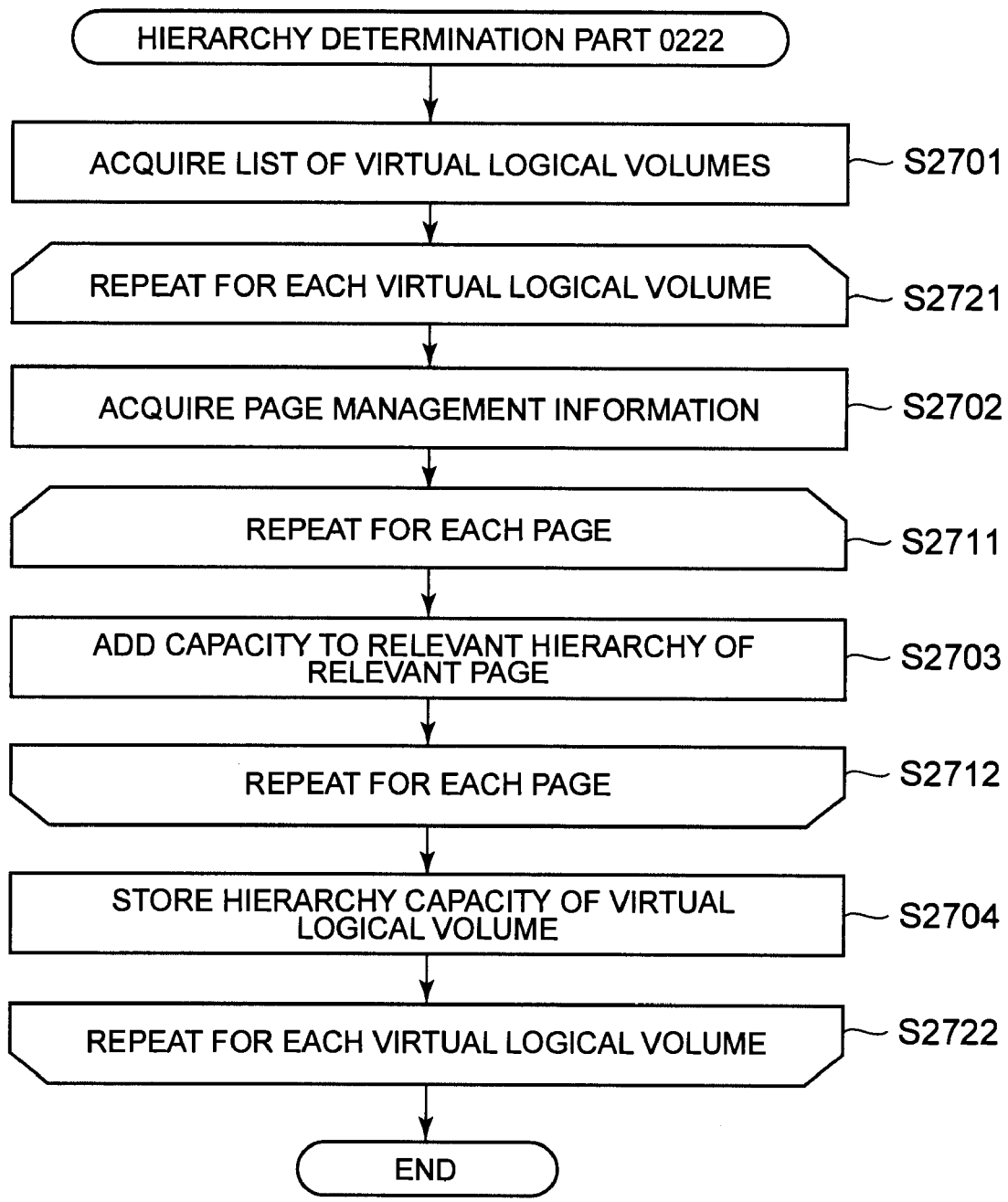
FIG. 27 is a flowchart showing the processing of a hierarchy determination part of the third embodiment.

FIG. 27 is a diagram showing a flowchart of processing in which the hierarchy determination part 0222 calculates the capacity for each storage hierarchy that configures the virtual logical volume 0127, and stores same in the virtual logical volume hierarchy log table 2601.

In Step S2701, the hierarchy determination part 0222 acquires from the virtual logical volume management table 0401 a list of the virtual logical volumes 0127. In the subsequent steps, the hierarchy determination part 0222 carries out processing with respect to the above-mentioned acquired virtual logical volumes.

In Step S2702, the hierarchy determination part 0222 acquires from the page management table 0901 the record of the page 0128 that configures the relevant virtual logical volume. The condition when acquiring the above-mentioned record is that the virtual logical volume ID 0912 be identical to the ID of the relevant virtual logical volume. In the subsequent steps, the hierarchy determination part 0222 calculates the total capacity of each storage hierarchy of the above-mentioned record-acquired page.

In Step S2703, the hierarchy determination part 0222 adds the capacity of the relevant page to the sum of the relevant storage hierarchies for the relevant page acquired in Step S2702.

The processing of Step S2703 is repeated in Steps S2711 and S2712 for each page acquired in Step S2702.

In Step S2704, the hierarchy determination part 0222 executes Steps S2711 and S2712 and stores the computed sum of the capacities for each storage hierarchy that configures the relevant virtual logical volume in the virtual logical volume hierarchy log table 2601.

The processing of Steps S2702 through S2704 is repeated in Steps S2711 and S2712 for each virtual logical volume 0127 acquired in Step S2701.

Figure 28:
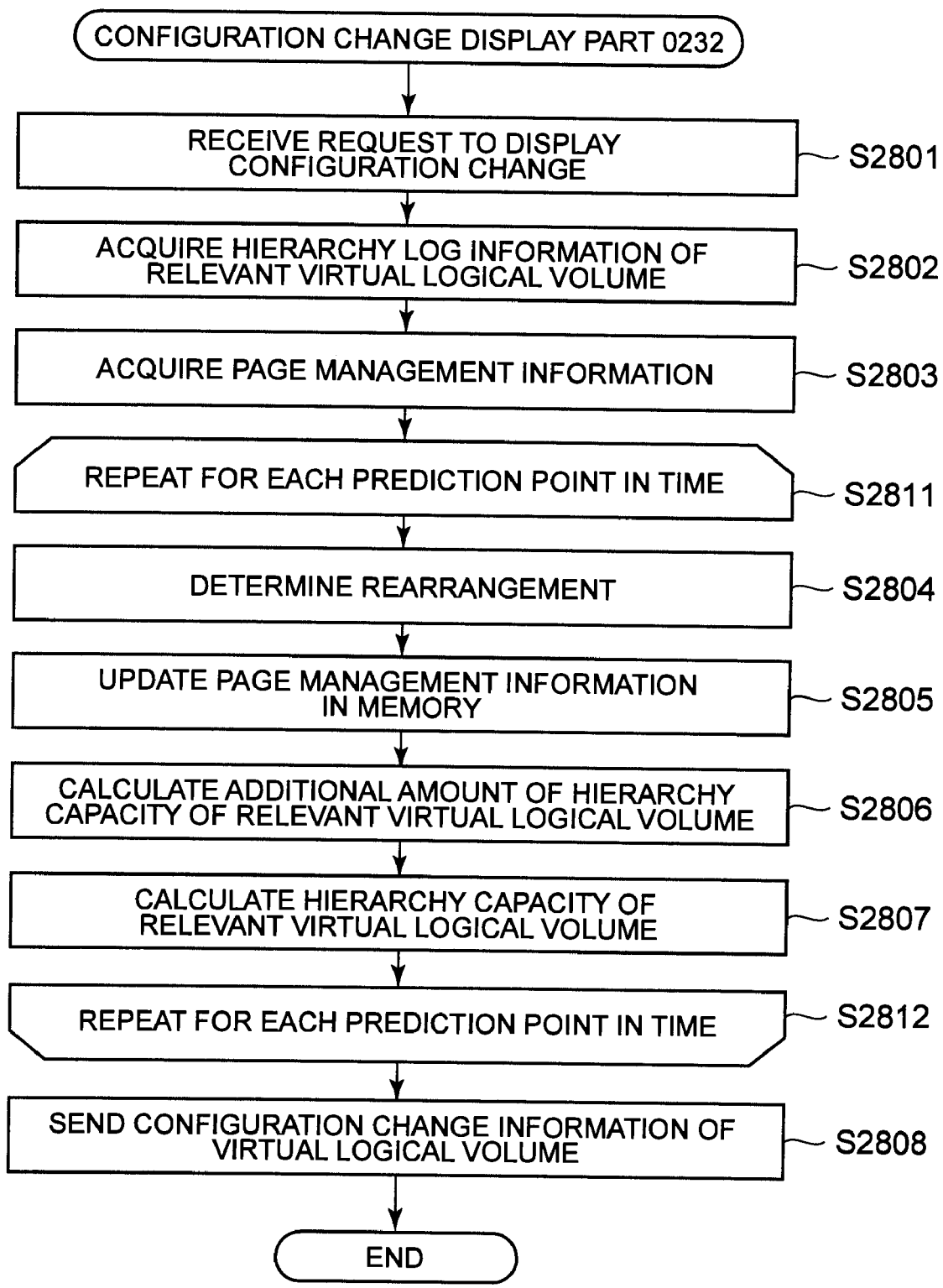
FIG. 28 is a flowchart showing the processing of a configuration change display part of the third embodiment.

FIG. 28 is a diagram showing a flowchart of processing in which the configuration change display part 0232 sends the configuration change information of the virtual logical volume 0127 for which a display request was received from the management client 0107.

In Step S2801, the configuration change display part 0232 receives a request from the management client 0107 to display a configuration change of the virtual logical volume 0127. The request comprises information that specifies the display-targeted virtual logical volume 0127 and information regarding the time period for displaying the configuration change. The configuration change display part 0232 calculates the points in time that will be used in the display based on the received time period. In the subsequent steps, the configuration change display part 0232 calculates the configuration of the storage hierarchy of the relevant virtual logical volume at the above-mentioned calculated points in time, and outputs this configuration to the management client 0107. Note that the configuration change display part 0232 calculates the configuration of the relevant virtual logical volume storage hierarchy using data acquired from the virtual logical volume hierarchy log table 2601 in a case where the above-mentioned point in time is in the past, and calculates this configuration using the job access prediction table 1301 in a case where the above-mentioned point in time is in the future.

In Step S2802, the hierarchy determination part 0222 acquires the hierarchy information of the relevant virtual logical volume from the virtual logical volume hierarchy log table 2601 at the above-mentioned past point in time and at the present point in time. The configuration change display part 0232 uses the most recent of the above-mentioned point-in-time data of the acquired data.

In this embodiment, the configuration change display part 0232 uses the most recent data, but it may commonly either select any one data of before or after, or may use an average of the before and after storage hierarchies data. Here, when it uses the following data at the same time, it does in step S2803 as well as the prediction in the future and present data calculates the prediction figure at present from step S2811 in step S2812.

In Step S2803, the hierarchy determination part 0222 acquires from the page management table 0901 the record of the page 0128 that was allocated to the relevant virtual logical volume 0127, and deploys the page ID and the storage hierarchy data to the memory. The condition when acquiring the above-mentioned page record is that the virtual logical volume ID 0912 be identical to the ID of the relevant virtual logical volume. In the subsequent steps, the hierarchy determination part 0222 uses the page information in the above-mentioned memory and the job access prediction to predict the storage hierarchy of the logical volume 0125 in which the logical volume-stored page data of the above mentioned page of a future point in time is stored.

In Step S2804, the hierarchy determination part 0222 predicts the arrangement hierarchy of the logical volume 0125 in which the logical volume-stored page data of the page is stored using steps similar to those of the rearrangement execution part 0221. The hierarchy determination part 0222 executes the processing of the Steps S2002 through S2005 or S2006 for each page, and acquires the arrangement hierarchy of the logical volume 0125 in which the logical volume-stored page data of each page is stored. However, the hierarchy determination part 0222 uses the data deployed to the memory in Step S2803 rather than the data of the page management table 0901 in Step S2002. Further, the hierarchy determination part 0222 uses the date/time of the relevant predicted point in time rather than the current date/time in Step S2003.

In Step S2805, the hierarchy determination part 0222 updates the storage hierarchy of each page deployed to memory in Step S2803 with the arrangement hierarchy of Step S2804.

In Step S2806, the configuration change display part 0232 calculates the increase in the capacity of each storage hierarchy of the relevant virtual logical volume from the current point in time until the relevant predicted point in time. The configuration change display part 0232 calculates the increase per unit of time of each storage hierarchy using the data of the two points in time acquired in Step S2802, finds the product of the period from the current point in time until the predicted point in time and the above-mentioned per-unit amount of increase, and makes this product the amount of increase of storage hierarchy capacity. In this embodiment, a method for calculating the amount of increase of the capacity of the virtual logical volume in accordance with the amount of increase per unit of time, which is calculated from two points in time for each storage hierarchy, is given as an example, but in the present invention it is also possible to calculate this amount of increase using another method.

In Step S2807, the configuration change display part 0232 calculates the capacity of each storage hierarchy of the relevant virtual logical volume at the predicted point in time. The configuration change display part 0232 finds the sum of the information of each page that was updated in Step S2805 and the increase of the capacity of each hierarchy that was calculated in Step S2806, and makes this sum the capacity of the hierarchy of the relevant virtual logical volume at the predicted point in time.

The processing of Steps S2804 through S2807 is repeated in Steps S2811 and S2812 for each predicted point in time.

In Step S2808, the configuration change display part 0232 uses the capacity information of each hierarchy acquired in Steps S2802 and S2807 and sends to the management client 0107 information denoting the transition of the capacity of each hierarchy at past, present and future points in time. An example of the information, which is sent to the above-mentioned management client and displayed by the above-mentioned management client, will be described using FIG. 29.

FIG. 29 is a diagram showing an example in which information displaying a configuration change in the virtual logical volume 0127 is received by the management client 0107 from the configuration change display part 0232 and displayed.

A storage hierarchy configuration change graph 2911 is for plotting a bar graph of changes in the capacity of the storage hierarchies of the virtual logical volume 1027 at a plurality of points in time. The horizontal axis of the storage hierarchy configuration change graph 2911 represents the date and the vertical axis represents the capacity. A storage hierarchy configuration change table 2920 shows the capacity of the storage hierarchies of the virtual logical volume 0127 at a plurality of points in time. Each record of the storage hierarchy configuration change table 2920 corresponds to a hierarchy of the relevant virtual logical volume, and displays the capacities utilized by the relevant virtual logical volume. The first column of the storage hierarchy configuration change table 2920 shows the storage hierarchies of the records, and the respective columns besides the first show the dates.

According to this embodiment, it is possible for the user to grasp a configuration change in the virtual logical volume, and to understand the effect of predicting an access from a job and rearranging the above-mentioned virtual logical volume. The user is also able to view a configuration change in the virtual logical volume and a change in allocation amount, thereby making it possible for the user to give consideration to a time period for augmenting the disks.

The first through the third embodiment may be executed using all sorts of combinations. Further, the storage apparatus 0102, the management server 0103, and the business server 0101 comprise clocks and manage time using their respective computers, and as such there may be cases where the clocks, which are strictly managed by each computer, deviate from one another. For this reason, in the present invention, in a case where times are to be compared (for example, a comparison to determine whether or not times are identical, the time order, and so forth), a prescribed time margin, which takes into account deviations in the times of the respective computers, may be provided, and when a check of two times is done to determine whether or not the times are identical, in a case where the two times fall within the time margin, they may be regarded as identical.

Lastly, as examples of job execution control in the present invention, cases which provide both a chronological execution condition (may also be referred to as the execution date/time) of a job as in FIG. 10 and an inter-job execution order condition as in FIG. 11 were explained, but since it is sufficient in the present application to know at the least the scheduled execution time of a job that is to be executed in the future, the computer system may be realized using only a portion of the information of FIG. 10.

Information on the execution time of a plurality of jobs and information on the order of executing the respective jobs input from management client to memory of management server are stored. When the data of the page whose execution time of job is time that the job is executed on the business server and job is the arrangement unit of the storage apparatus is used, the execution time of this job is thought to be time that the job accesses the page of storage apparatus. Moreover, the identifier that identifies the access time that the job accessed the page of the storage apparatus by the business server and the same accessed page is acquired from the storage apparatus, and the management server is stored in the memory. The management server decides a job concerned the same accessed identifier on the page and to correspond by using the relation with execution time information on the access time and information on the order of executing the respective jobs. In addition, the execution time of the job that will be executed next time is decided from execution time information on the job that will be executed decided next time and information on the order of executing the respective jobs, and it can again be an execution time of this job that decides it that the job that will be executed next time is time of the management server to access the page of the storage apparatus. Because the management server can know can know time that the job is executed next, that is, time that the job accesses the page of the storage apparatus next, time zone that this access is not executed becomes possible for time zone that the access is executed again by moving the data of the page of the storage apparatus that this job accesses to the memory with slow access speed to move the data of this page to the memory with fast access speed, and for the storage apparatus to return the data that the job of the business server accesses at high speed by using execution time information on the job it.

What is claimed is:

1. A management server coupled to a storage apparatus, which is coupled to a computer for executing a job and which records data of the computer, comprising:

a memory;

a CPU referring the memory;

a storage device, wherein the storage apparatus comprises a plurality of storage devices having at least two different performances, configures a storage unit, which is a logical storage area allocated to the storage device, and comprises a function for changing the allocation of the storage unit between the plurality of storage devices having the two different performances, wherein job execution time information is stored in the storage device, and wherein the management server is configured to:

store, as access information, a time at which an access has been made to the storage apparatus from the computer and an identifier of a storage unit accessed at the time, which have been sent from the storage apparatus, and based on the job execution time information and the access information, associate a time at which a job is executed with the time of the access to the storage apparatus and specify the job accessed the storage unit at the access time, associate the specified job with the job execution time information, decide the time at which the next access is to be carried out to the storage unit, and send the identifier of the storage unit to the storage apparatus prior to the decided access time.

2. A system, which is configured from a storage apparatus, which is coupled to a computer for executing a plurality of jobs and which has a plurality of storage devices for recording data of the computer, and a management server that is coupled to the storage apparatus, wherein the data is generated by a job that is executed by the computer, wherein the plurality of storage devices comprise a plurality of first storage devices and a plurality of second storage devices having mutually different performances, wherein the storage apparatus comprises:

a first logical storage area configured using the plurality of first storage devices; and a second logical storage area configured using the plurality of second storage devices, wherein, when a job accesses a virtual volume and the data is written to the virtual volume, the storage apparatus is configured to allocate a portion of either the first logical storage area or the second logical storage area to the virtual volume as a page, and store the access time and an identifier of the accessed page, and, in addition, send this time and identifier to the management server, wherein the management server comprises a storage device, wherein the storage device is configured to store information on the execution time of a plurality of jobs and information on the order of the execution of the jobs, the sent access time, and the page identifier, and the management server is configured to decide on a time of a next access to the page, based on information on the execution time of a plurality of jobs, information on the order of executing the respective jobs, the sent access time and the page identifier, which are stored in the storage device, and send the page identifier prior to the decided access time.

3. A system according to claim 2, wherein the management server is configured so that:

with respect to a time at which the next access is to be carried out to the page, a corresponding relationship between the access time and information on the execution time of the plurality of jobs is used to decide on a correspondence between the identifier of the accessed page and a relevant job, wherein a correspondence between the identifier of the accessed page and information on the order of executing the relevant job is decided, based on a correspondence between the identifier of the accessed page and the relevant job, and the information on the order of executing the jobs, wherein the job to be executed next with respect to the accessed page is decided, based on a correspondence between the identifier of the accessed page and the information on the order of executing the relevant job, and the information on the order of executing the plurality of jobs, wherein the execution time of the job to be executed next is decided based on information on the execution time for a job decided to be executed next and the plurality of jobs, and wherein a decision is made by using the job execution time as the access time.

4. A system according to claim 3, wherein the management server is configured to:

associate a job log with job definition information;
infer a job that is likely to access the relevant page of the relevant virtual storage device, and the time at which the job is to be executed; and use the time at which the job is to be executed as the access time.

5. A system according to claim 4,
wherein the management server is configured to:
store in the storage device, as a job access prediction, the access time, the virtual volume identifier, the identifier of the allocated page, and the jobs related; and
send the virtual volume identifier and the identifier of the allocated page prior to the inferred access time, based on the job access prediction.

6. A system according to claim 5,
wherein with a job requested performance denoting a job requested performance hierarchy being included in the job definition information,
wherein the management server is configured to associate the job log with the job definition information and infer a job that is likely to access the relevant page on the relevant virtual storage device, the time at which the job is to be executed, and a performance to be requested in the access, and
wherein the access requested performance is included in the job access prediction.

7. A system according to claim 5,
wherein the job definition information is associated with the job access prediction, a job access of prior to the access time is inferred, and the job access prediction is stored.

8. A system according to claim 2,
wherein the storage apparatus is configured to change the page allocation for the first logical storage area and the second logical storage area, based on information sent from the management server.

9. A system according to claim 2,
wherein the system comprises a management client that is coupled to the management server,
wherein the management client is configured to send the job definition information to the management server, and
wherein the management server is configured to store the job definition information in the storage device.

* * * * *